(12) United States Patent
Gupta et al.

(10) Patent No.: US 8,565,799 B2
(45) Date of Patent: Oct. 22, 2013

(54) METHODS AND APPARATUS FOR FLOW DATA ACQUISITION IN A MULTI-FREQUENCY NETWORK

(75) Inventors: Binita Gupta, San Diego, CA (US); An Mei Chen, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 765 days.

(21) Appl. No.: 12/051,752

(22) Filed: Mar. 19, 2008

(65) Prior Publication Data

US 2008/0253287 A1    Oct. 16, 2008

Related U.S. Application Data

(60) Provisional application No. 60/910,191, filed on Apr. 4, 2007, provisional application No. 60/945,317, filed on Jun. 20, 2007.

(51) Int. Cl.
*H04W 72/10* (2009.01)
(52) U.S. Cl.
USPC ..... 455/512; 455/513; 455/432.3; 455/435.1; 370/235; 370/253; 370/343
(58) Field of Classification Search
USPC ............ 455/414.142, 450, 452.2, 512, 166.2, 455/436, 513, 432.3, 435.1; 370/235, 370/235.1, 252, 230, 231, 232, 330, 253, 370/343; 709/224, 223, 225, 229
See application file for complete search history.

(56) References Cited

U.S. PATENT DOCUMENTS

| 5,109,527 A | 4/1992 | Akerberg |
| 5,203,010 A | 4/1993 | Felix et al. |
| 5,471,662 A | 11/1995 | Shiota |

(Continued)

FOREIGN PATENT DOCUMENTS

| EP | 1648097 A2 | 4/2006 |
| EP | 1715711 A1 | 10/2006 |

(Continued)

OTHER PUBLICATIONS

"Universal Mobile Telecommunications System (UMTS); Radio Resource Control (RRC); Protocol specification (3GPP TS 25.331 version 7.4.0 Release 7); ETSI TS 125 331", ETSI Standards, LIS, Sophia Antiplois Cedex, France, vol. 3-R2, No. V7.4.0, Mar. 1, 2007, XP014037920, Issn: 0000-0001, p. 276-p. 277.

(Continued)

*Primary Examiner* — Tan Trinh
(74) *Attorney, Agent, or Firm* — Fulbright & Jaworski LLP

(57) ABSTRACT

Methods and apparatus for flow data acquisition in a multi-frequency network. In an aspect, a method includes receiving flow registrations associated with flows, assigning a priority to the flow registrations, grouping the flows into flow groups based on their priority and RF channels carrying the flows, wherein each flow group is assigned a ranking, selecting a flow group based on the ranking, and acquiring flow data for the flows associated with the flow group. An apparatus includes registration logic configured to receive flow registrations associated with flows, priority logic configured to assign a priority to the flow registrations, and acquisition processing logic configured to group the flows into flow groups based on their priority and RF channels carrying the flows, wherein each flow group is assigned a ranking, select a flow group based on the ranking, and acquire flow data for the flows associated with the flow group.

65 Claims, 11 Drawing Sheets

(56) References Cited

U.S. PATENT DOCUMENTS

| | | | |
|---|---|---|---|
| 5,627,880 A | 5/1997 | Rozanski et al. | |
| 5,745,481 A | 4/1998 | Phillips et al. | |
| 5,784,695 A | 7/1998 | Upton et al. | |
| 5,787,346 A | 7/1998 | Iseyama | |
| 5,995,834 A | 11/1999 | Moore | |
| 5,995,843 A | 11/1999 | Sjodin et al. | |
| 6,112,085 A | 8/2000 | Garner et al. | |
| 6,195,552 B1 | 2/2001 | Jeong et al. | |
| 6,272,343 B1 | 8/2001 | Pon et al. | |
| 6,490,259 B1 | 12/2002 | Agrawal et al. | |
| 6,675,209 B1* | 1/2004 | Britt | 709/224 |
| 7,170,905 B1 | 1/2007 | Baum et al. | |
| 7,193,968 B1 | 3/2007 | Kapoor et al. | |
| 7,436,903 B2 | 10/2008 | Sandhu et al. | |
| 7,450,546 B2 | 11/2008 | Lee et al. | |
| 7,583,633 B2 | 9/2009 | Woo et al. | |
| 7,654,151 B2* | 2/2010 | Agar et al. | 73/861.01 |
| 7,660,275 B2 | 2/2010 | Vijayan et al. | |
| 7,738,356 B2 | 6/2010 | Kim | |
| 7,813,320 B2 | 10/2010 | Kim et al. | |
| 7,948,907 B2 | 5/2011 | Wang et al. | |
| 7,965,686 B1 | 6/2011 | Bridge et al. | |
| 8,077,801 B2 | 12/2011 | Malladi | |
| 8,108,895 B2 | 1/2012 | Anderson et al. | |
| 8,149,748 B2 | 4/2012 | Bata et al. | |
| 8,155,649 B2 | 4/2012 | McHenry et al. | |
| 8,189,501 B2 | 5/2012 | Eidenschink et al. | |
| 8,270,368 B2 | 9/2012 | Hirano et al. | |
| 8,457,064 B2* | 6/2013 | Gupta et al. | 370/331 |
| 2003/0067895 A1 | 4/2003 | Paneth et al. | |
| 2003/0187570 A1 | 10/2003 | Impson et al. | |
| 2003/0203735 A1 | 10/2003 | Andrus et al. | |
| 2004/0013089 A1* | 1/2004 | Taneja et al. | 370/235 |
| 2004/0125769 A1 | 7/2004 | Vare | |
| 2004/0156347 A1 | 8/2004 | Kim | |
| 2004/0202140 A1 | 10/2004 | Kim et al. | |
| 2004/0203336 A1 | 10/2004 | Sinnarajah et al. | |
| 2004/0223561 A1 | 11/2004 | Tahat | |
| 2004/0228304 A1 | 11/2004 | Riedel et al. | |
| 2004/0266426 A1 | 12/2004 | Marsh et al. | |
| 2005/0075084 A1 | 4/2005 | Salokannel et al. | |
| 2005/0090978 A1* | 4/2005 | Bathory et al. | 701/213 |
| 2005/0195763 A1 | 9/2005 | Kadous et al. | |
| 2005/0220106 A1 | 10/2005 | Raverdy et al. | |
| 2006/0013186 A1 | 1/2006 | Agrawal et al. | |
| 2006/0052098 A1 | 3/2006 | Lee et al. | |
| 2006/0056344 A1 | 3/2006 | Roy et al. | |
| 2006/0109820 A1 | 5/2006 | Miyata | |
| 2006/0153133 A1 | 7/2006 | Zhong | |
| 2006/0168475 A1* | 7/2006 | Segers et al. | 714/25 |
| 2006/0246887 A1 | 11/2006 | Barclay et al. | |
| 2006/0250937 A1 | 11/2006 | Wang et al. | |
| 2006/0252420 A1 | 11/2006 | Mantravadi et al. | |
| 2006/0268756 A1 | 11/2006 | Wang et al. | |
| 2007/0041344 A1 | 2/2007 | Yaqub et al. | |
| 2007/0064652 A1 | 3/2007 | Xu et al. | |
| 2007/0149240 A1 | 6/2007 | Brok | |
| 2007/0156379 A1* | 7/2007 | Kulkarni et al. | 703/14 |
| 2007/0173256 A1 | 7/2007 | Laroia et al. | |
| 2007/0183444 A1* | 8/2007 | Schoettle | 370/449 |
| 2007/0189404 A1 | 8/2007 | Baum et al. | |
| 2007/0202887 A1 | 8/2007 | Counts et al. | |
| 2007/0217383 A1 | 9/2007 | Mitani | |
| 2007/0232307 A1 | 10/2007 | Ibrahim et al. | |
| 2007/0291694 A1 | 12/2007 | Zhang | |
| 2008/0000306 A1* | 1/2008 | Agar et al. | 73/861.04 |
| 2008/0002611 A1 | 1/2008 | Walker et al. | |
| 2008/0025597 A1* | 1/2008 | Muramatsu et al. | 382/156 |
| 2008/0049702 A1 | 2/2008 | Meylan et al. | |
| 2008/0102834 A1 | 5/2008 | Bernhard et al. | |
| 2008/0132264 A1 | 6/2008 | Krishnamurthy et al. | |
| 2008/0132282 A1 | 6/2008 | Liu et al. | |
| 2008/0198763 A1 | 8/2008 | Fischer et al. | |
| 2008/0247364 A1 | 10/2008 | Kim et al. | |
| 2008/0253331 A1 | 10/2008 | Gupta et al. | |
| 2008/0259894 A1* | 10/2008 | Gupta et al. | 370/343 |
| 2008/0259911 A1* | 10/2008 | Gupta et al. | 370/356 |
| 2008/0268844 A1 | 10/2008 | Ma et al. | |
| 2009/0005120 A1 | 1/2009 | Ylitalo | |
| 2009/0010225 A1* | 1/2009 | Gupta | 370/331 |
| 2009/0029705 A1* | 1/2009 | Gupta et al. | 455/436 |
| 2009/0124210 A1 | 5/2009 | Imai et al. | |
| 2009/0197604 A1* | 8/2009 | Gupta et al. | 455/436 |
| 2009/0225646 A1 | 9/2009 | Dayal et al. | |
| 2009/0233602 A1 | 9/2009 | Hughes | |
| 2009/0274119 A1 | 11/2009 | Gupta et al. | |
| 2009/0304120 A1 | 12/2009 | Agrawal et al. | |
| 2010/0046445 A1 | 2/2010 | Sawahashi et al. | |
| 2011/0038350 A1* | 2/2011 | Gholmieh et al. | 370/331 |
| 2012/0094692 A1 | 4/2012 | MacDonald et al. | |

FOREIGN PATENT DOCUMENTS

| | | |
|---|---|---|
| EP | 1758410 A2 | 2/2007 |
| EP | 1758423 A1 | 2/2007 |
| EP | 1773006 A1 | 4/2007 |
| JP | 10108267 A | 4/1998 |
| JP | 2004207922 A | 7/2004 |
| JP | 2005524366 A | 8/2005 |
| JP | 2006148836 A | 6/2006 |
| JP | 2006287959 A | 10/2006 |
| JP | 2006333243 A | 12/2006 |
| JP | 2007518380 A | 7/2007 |
| JP | 2008537395 A | 9/2008 |
| JP | 2009527142 A | 7/2009 |
| KR | 20050051865 A | 6/2005 |
| KR | 20050085570 A | 8/2005 |
| KR | 100895173 B1 | 5/2009 |
| RU | 2161869 C1 | 1/2001 |
| RU | 2002123921 A | 2/2004 |
| WO | WO0038463 A2 | 6/2000 |
| WO | 0160106 A1 | 8/2001 |
| WO | WO0232160 | 4/2002 |
| WO | 03073779 | 9/2003 |
| WO | 05117321 | 12/2005 |
| WO | 2006102077 A1 | 9/2006 |
| WO | WO2006110445 A1 | 10/2006 |
| WO | WO2006110456 A1 | 10/2006 |
| WO | WO2007052768 A1 | 5/2007 |
| WO | 2008157816 A2 | 12/2008 |

OTHER PUBLICATIONS

International Search Report, PCT/US2008/057946, International Searching Authority, European Patent Office, Oct. 27, 2008.
Written Opinion, PCT/US2008/057946, International Searching Authority, European Patent Office, Oct. 27, 2008.
Koji Ishibashi et al: "Low Complexity Bit-Interleaved Coded DAPSK with Cyclic Delay Diversity" IEEE International Symposium on Personal, Indoor and Mobile Radio Communications, Sep. 1, 2007, XP031168300.
Roland Bless et al: "A quality-of-service signaling architecture for seamless handover support in next generation, IP-based mobile networks" Wireless Personal Communications, vol. 43, No. 3, Jun. 13, 2007, pp. 817-835, XP019557969.
Office Action in Korean application 10-2009-7024098 corresponding to U.S. Appl. No. 12/143,103, citing WO0232160 and KR20050085570 dated Apr. 18, 2011.
International Preliminary Report on Patentability, PCT/US2008/057946, International Bureau, The International Bureau of WIPO, Oct. 15, 2009.
Maeda S., "4-5. Multichannel Broadcast Service for Cellular Phones: MediaFLO," Journal of the Institute of Image Information and Television Engineers, Japan, May 1, 2006, vol. 60, No. 5, pp. 725-727.

* cited by examiner

METHODS AND APPARATUS FOR FLOW DATA ACQUISITION IN A MULTI-FREQUENCY NETWORK

CLAIM OF PRIORITY UNDER 35 U.S.C. §119

The present Application for Patent claims priority to Provisional Application No. 60/910,191, entitled "Methods and Apparatus for Providing Flow Data Acquisition Priority Scheme in a Multiple Frequency Network," filed Apr. 4, 2007, and to Provisional Application No. 60/945,317, entitled "Methods And Apparatus for Providing Flow Data Acquisition Priority Scheme in a Multiple Frequency Network," filed Jun. 20, 2007, both assigned to the assignee hereof and hereby expressly incorporated by reference herein.

CROSS-REFERENCE TO RELATED APPLICATIONS

This application is related to Provisional Application No. 60/896,255 entitled "Methods and Apparatus for Providing Handoff in Multiple Frequency Networks" filed Mar. 21, 2007, and to Provisional Application No. 60/945,292, entitled "Methods and Apparatus for Providing Handoff in a Multiple Frequency Network," filed Jun. 20, 2007, both assigned to the assignee hereof and hereby expressly incorporated by reference herein.

BACKGROUND

1. Field

The present application relates generally to the operation of data networks, and more particularly, to methods and apparatus for flow data acquisition in a multi-frequency network.

2. Background

Data networks, such as wireless communication networks, have to trade off between services customized for a single terminal and services provided to a large number of terminals. For example, the distribution of multimedia content to a large number of resource limited portable devices (subscribers) is a complicated problem. Therefore, it is important for network operators, content retailers, and service providers to have a way to distribute content and/or other network services in a fast and efficient manner and in such a way as to increase bandwidth utilization and power efficiency.

A multi-frequency network (MFN) is a network in which multiple radio frequencies (RFs or RF channels) are used to transmit media content. One type of MFN is horizontal multi-frequency network (HMFN) where a distribution waveform is transmitted over different RF channels in different local areas. The same or different content may be transmitted as part of distribution waveform carried over different RF channels in such local areas. Another type of MFN is vertical multi-frequency network (VMFN) in which multiple radio frequency (RF) bands (or channels) are used in a given local area to transmit independent distribution waveforms with an aim to increase the capacity of the network (in terms of the ability to deliver more content to a device/end user). For instance, a VMFN provides a mode of operation where two waveforms carrying different content are transmitted on two different RF channels, respectively, in a given local area. The content may be in the form of content flows, which may comprise audio, video, or any other type of content flow. An MFN deployment can also consist of VMFN in certain areas and HMFN in certain other areas.

In a typical HMFN, a local operations infrastructure (LOI) comprises transmitting sites that operate to transmit a distribution waveform over a single RF channel in a selected geographic area. In a typical VMFN, a local operations infrastructure (LOI) comprises transmitting sites that operate to transmit multiple distribution waveforms over multiple RF channels in a selected geographic area. Each distribution waveform may comprise one or more content flows that can be selected at a receiving device for rendering. Adjacent LOIs may utilize the same or different RF channels.

In a single frequency network (SFN), all content flows are transmitted on a single radio frequency (RF) channel. A device can acquire flow data associated with multiple flows at the same time in an SFN. For example, in a single frequency network, a single distribution waveform comprising flow data for multiple content flows is received at a device on the single RF channel. Thus, while the device is receiving and decoding a real time service, flow data for other types of content flows can be acquired simultaneously. Also, the device can receive flow data for multiple non real time content flows at the same time.

However, in a vertical MFN, the device may need to acquire flow data for content flows associated with multiple multiplexes carried on different RF channels in the current LOI. Typically the receiver on the device can tune to only one RF channel at a given time for decoding content. For example, the device may be decoding a real time service flow carried on a particular RF channel and may need to decode a non real time service flow carried on a different RF channel. If the device switches RF channels to acquire the non real time service flow data from another RF channel, the decoding of the real time service will be interrupted, which may result in an unsatisfactory user experience. Similarly, the device may be decoding a non real time service flow carried on a particular RF channel and may need to decode a second non real time service flow carried on a different RF channel. Switching RF channels to acquire the second non real time service flow will result in interrupting the decoding for the currently decoded non real time service flow, which may not be desirable.

Therefore, it would be desirable to have a system that operates to provide fast and efficient flow data acquisition in a vertical multi-frequency network so that interruptions to flow data acquisition for real time services and non real time services can be minimized.

SUMMARY

In one or more aspects, a flow data acquisition system, comprising methods and apparatus, operates to acquire flow data in a vertical multi-frequency network.

In an aspect, a method is provided for flow data acquisition in a multi-frequency network. The method comprises receiving one or more flow registrations associated with one or more flows, respectively, assigning a priority to each of the one or more flow registrations, grouping the one or more flows into flow groups based on the associated priority and RF channels carrying the one or more flows, wherein each flow group is assigned a ranking, selecting a selected flow group based on the ranking, and acquiring flow data for the flows associated with the selected flow group.

In an aspect, an apparatus is provided for flow data acquisition in a multi-frequency network. The apparatus comprises registration logic configured to receive one or more flow registrations associated with one or more flows, respectively, priority logic configured to assign a priority to each of the one or more flow registrations, and acquisition processing logic configured to group the one or more flows into flow groups based on the associated priority and RF channels carrying the one or more flows, wherein each flow group is assigned a ranking, select a selected flow group based on the ranking, and acquire flow data for the flows associated with the selected flow group.

In an aspect, an apparatus is provided for flow data acquisition in a multi-frequency network. The apparatus comprises means for receiving one or more flow registrations associated with one or more flows, respectively, means for assigning a priority to each of the one or more flow registrations, means for grouping the one or more flows into flow groups based on the associated priority and RF channels carrying the one or more flows, wherein each flow group is assigned a ranking, means for selecting a selected flow group based on the ranking, and means for acquiring flow data for the flows associated with the selected flow group.

In an aspect, a computer program product is provided for flow data acquisition in a multi-frequency network. The computer program product comprises a machine-readable medium that comprises a first set of codes for causing a computer to receive one or more flow registrations associated with one or more flows, respectively, a second set of codes for causing the computer to assign a priority to each of the one or more flow registrations, a third set of codes for causing the computer to group the one or more flows into flow groups based on the associated priority and RF channels carrying the one or more flows, wherein each flow group is assigned a ranking, a fourth set of codes for causing the computer to select a selected flow group based on the ranking, and a fifth set of codes for causing the computer to acquire flow data for the flows associated with the selected flow group.

In an aspect, at least one integrated circuit is provided that is configured to perform flow data acquisition in a multi-frequency network. The at least one integrated circuit comprises a first module configured to receive one or more flow registrations associated with one or more flows, respectively, a second module configured to assign a priority to each of the one or more flow registrations, a third module configured to group the one or more flows into flow groups based on the associated priority and RF channels carrying the one or more flows, wherein each flow group is assigned a ranking, a fourth module configured to select a selected flow group based on the ranking, and a fifth module configured to acquire flow data for the flows associated with the selected flow group.

In an aspect, a method is provided for flow data acquisition in a multi-frequency network. The method comprises receiving one or more activations associated with one or more real time flows, respectively, determining that the one or more real time flows are present in a current control channel, assigning a priority to each of the one or more real time flows, and acquiring flow data associated with the one or more real time flows based on the priority.

In an aspect, an apparatus is provided for flow data acquisition in a multi-frequency network. The apparatus comprises activation logic configured to receive one or more activations associated with one or more real time flows, respectively, and to determine that the one or more real time flows are present in a current control channel, flow priority logic configured to assign a priority to each of the one or more real time flows, and acquisition logic configured to acquire flow data associated with the one or more real time flows based on the priority.

Other aspects will become apparent after review of the hereinafter set forth Brief Description of the Drawings, Description, and the Claims.

BRIEF DESCRIPTION OF THE DRAWINGS

The foregoing aspects described herein will become more readily apparent by reference to the following Description when taken in conjunction with the accompanying drawings wherein.

DESCRIPTION

In one or more aspects, a flow data acquisition system is provided that operates to acquire flow data in a vertical multi-frequency network. The flow data acquisition system operates to provide mechanisms for efficient flow data acquisition for real time service flows and non real time service flows. In an aspect, the flow data acquisition system operates to provide an activation mechanism to allow flow data acquisition for real time service flows without interruptions. In another aspect, the flow data acquisition system operates to provide a registration mechanism to allow flow data acquisition for non real time service flows based on a flow priority scheme.

The system is well suited for use in wireless network environments, but may be used in any type of network environment, including but not limited to, communication networks, public networks, such as the Internet, private networks, such as virtual private networks (VPN), local area networks, wide area networks, long haul networks, or any other type of data network.

Definitions

The following definitions are used herein to describe aspects of a switching system.

1. Local Area—Refers to a local geographic area such as a building, group of buildings, community, city, county or other local region in which services may be broadcast.
2. Wide Area—Refers to a wide geographic area such as a county, state, multiple states, country, multiple countries or other wide region in which services may be broadcast.
3. Multiplex—Refers to a grouping of content flows.
4. Wide Area Multiplex—Refers to a grouping of content flows that are broadcasted over at least one wide area.
5. Local Area Multiplex—Refers to grouping of content flows that are broadcasted over at least one local area.
6. Wide Area Operations Infrastructure (WOI)—Refers to a grouping of transmitters and associated systems that operate to transmit content flows over a wide area. A WOI maps to the smallest geographical wide area which can carry a wide area multiplex. A wide area multiplex may be broadcasted over one or more WOIs.
7. Local Area Operations Infrastructure (LOI)—Refers to a grouping of transmitters and associated systems that operate to transmit content flows over a local area. A LOI maps to the smallest geographical local area which can carry a local area multiplex. A local area multiplex may be broadcasted over one or more LOIs.
8. RF Channel—Refers to a radio frequency band that is used to convey a content distribution waveform over a selected LOI.
9. Content Channel—Refers to selected content flows within a particular distribution waveform. For example, a distribution waveform may comprise multiple content channels and each content channel may comprise one or more content flows.

Acronyms

Figure 1:
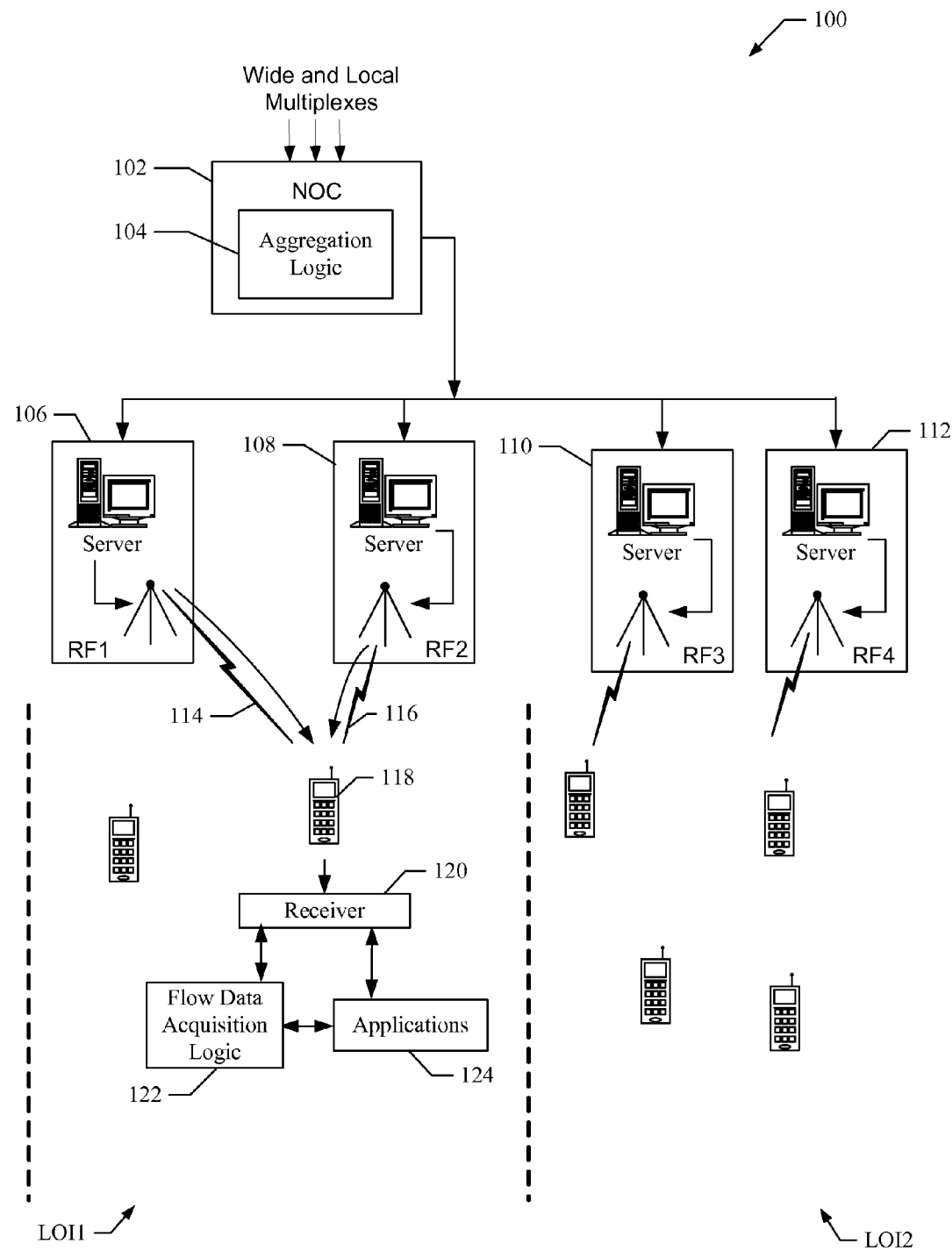
FIG. 1 shows a network that illustrates aspects of a flow data acquisition system.

The following acronyms are used herein to describe aspects of a switching system.
LM—Local Area Multiplex
WM—Wide Area Multiplex
NOC—Network Operations Center
LOC—Local Operations Center
LOI—Local Operations Infrastructure
WOI—Wide Operations Infrastructure
NDM—Neighbor Description Message
WID—Wide Area Descrambling Identifier
LID—Local Area Descrambling Identifier
DAP—Data Acquisition Procedure
PP—Preprocessing Procedure Flow Data Acquisition Overview FIG. 1 shows a network 100 that illustrates aspects of a flow data acquisition system. The network 100 comprises a network operations center (NOC) 102 and local operations infrastructures LOI1 and LOI2.

The NOC 102 operates to receive wide and local content multiplexes for distribution over selected wide and local areas of a multi-frequency network. The NOC 102 also operates to configure the multi-frequency network to distribute that content. To accomplish this, the NOC 102 is aware of the geographic regions of the network, the RF channels used in each region, and any other network information that may be needed to configure the network and distribute the wide and local content multiplexes.

In an aspect, the NOC 102 comprises aggregation logic 104. The aggregation logic 104 operates to aggregate overhead information relating to the distribution of the content multiplexes over the RF channels in each LOI. For example, the distribution overhead information identifies which content multiplexes are transmitted by each LOI, the RF channels that are used to transmit specific content multiplexes and the RF channels that are used to carry specific content flows associated with these content multiplexes. The NOC 102 operates to transmit the wide and local multiplexes and associated distribution overhead and any other signaling information to the LOIs in the network 100. It should be noted that although only two LOIs are shown, the NOC 102 may transmit the multiplexes and associated distribution overhead and any other signaling information to any number of LOIs in the network 100.

In an aspect, the LOI1 and L0I2 comprise one or more transmitter sites. For example, the LOI1 comprises transmitter sites 106 and 108 and the L0I2 comprises transmitter sites 110 and 112. Each transmitter site operates to transmit information on a selected RF channel over its respective LOI. For example, the transmitter site 106 transmits information over LOI1 using the RF channel RF1.

In an aspect, servers at the transmitter sites operate to receive multiplexes that are to be transmitted over their respective LOIs. The servers then operate to pack their respective multiplexes into transmission frames for transmission over selected RF channels. The servers utilize any suitable physical layer process to pack the multiplexes into the transmission frames for transmission.

The transmission frames comprise content flows associated with the wide and local multiplexes. In an aspect, the transmission frames comprise wide and local partitions that are used to convey the wide and local content flows, respectively. In addition, the wide and local partitions comprise wide and local control channels. In an aspect, either or both of the wide and local control channels are used to convey the distribution overhead and any other signaling information generated by the aggregation logic 104 to the devices in each LOI. Thus, the devices in the network 100 can determine the content that is available in their current LOI and the RF channel that carries that content.

In an aspect, the transmitter site 106 operates to transmit its transmission frames over the LOI1 using the RF channel (RF1) as shown at 114, and the transmitter site 108 operates to transmit its transmission frames over the LOI1 using the RF channel (RF2) as shown at 116. By using multiple RF channels, the network 100 is able to transmit more content flows over each LOI. It should be noted that the transmitter sites 106 and 108 may be co-located in the LOI1 or separated by any desired distance. The transmitter sites 110 and 112 located in L0I2 operate in a similar fashion.

In an aspect, a device 118 operating in LOI comprises a receiver 120 that operates to tune to a selected RF channel in LOI1 to receive selected transmission frames. For example, the receiver 120 operates to tune to the RF channel (RF1) 114 to receive the transmission frames from the transmitter site 106. The received transmission frames comprise wide and local content multiplexes and control channels that convey distribution overhead and any other signaling information generated by the aggregation logic 104.

The device 118 comprises applications 124 that operate to request reception of content flows and process the received content flows. For example, the applications 124 may operate to request, receive and render real time services, store and render content clips, and/or process other types of received content and/or data.

In an aspect, the applications 124 communicate with flow data acquisition logic 122 to request acquisition for flow data associated with one or more content flows belonging to one or more content multiplexes. In an aspect, the flow data acquisition system provides the following two mechanisms for applications to request flow data.

1. Flow Activation: Used by applications to receive flow data from the network immediately if the flow data is currently available. Hence this mechanism guarantees instant gratification for flow data to applications if requested data is currently being transmitted. The flow data may not be acquired immediately even if the data is currently being transmitted based on RF channel conflicts. This mechanism is used to receive flow data for flows which are real time in nature. These real time flows are referred to as activated flows in this document.
2. Flow Registration: Used by applications to receive flow data whenever that data becomes available on the network. The flow data may or may not be acquired immediately even if it is currently being transmitted based on flow priorities. This mechanism is used to receive flow data for flow which are non real time in nature. These non real time flows are referred to as registered flows in this document.

In an aspect, the flow activation mechanism operates to allow applications to request and immediately receive flow data for real time flows, such as real time multimedia flows if the data is currently being transmitted from the network and no RF channel conflicts are present. An RF channel conflict can happen if a real time flow is already being decoded and another real time flow gets activated on a different RF channel. In this case the activation for new real time flow fails as the device can only tune to one RF channel at a time to acquire content. The distribution overhead information received as part of the control channel is used to determine whether a real time flow is currently being transmitted and to determine the RF channel which carries that real time flow.

In an aspect, the flow registration mechanism allows applications to request and receive flow data associated with non real time flows, such as file delivery flows, IP Datacast flows, service overhead flows, and other types of non real time flows. For example, service overhead flows include programming guide flow and flow carrying list of subscription packages etc. The file delivery flows are used to deliver various types of media or data files to the device. The flow registration mechanism operates to prioritize and/or group the registered flows so as to optimize reception of flow data for multiple non real time flows carried across multiple RFs in a vertical MFN and without interrupting the reception of flow data for real time flows. A more detailed description of the flow activation and flow registration mechanisms supported by the flow data acquisition system is provided below.

Therefore, aspects of the flow data acquisition system operate to allow a device to acquire flow data in a multi-frequency network so as to optimize flow data reception for non real time flows without interrupting real time flow data reception. It should be noted that the network 100 illustrates just one implementation of the data acquisition system and that other implementations are possible within the scope of the various aspects.

Figure 2:
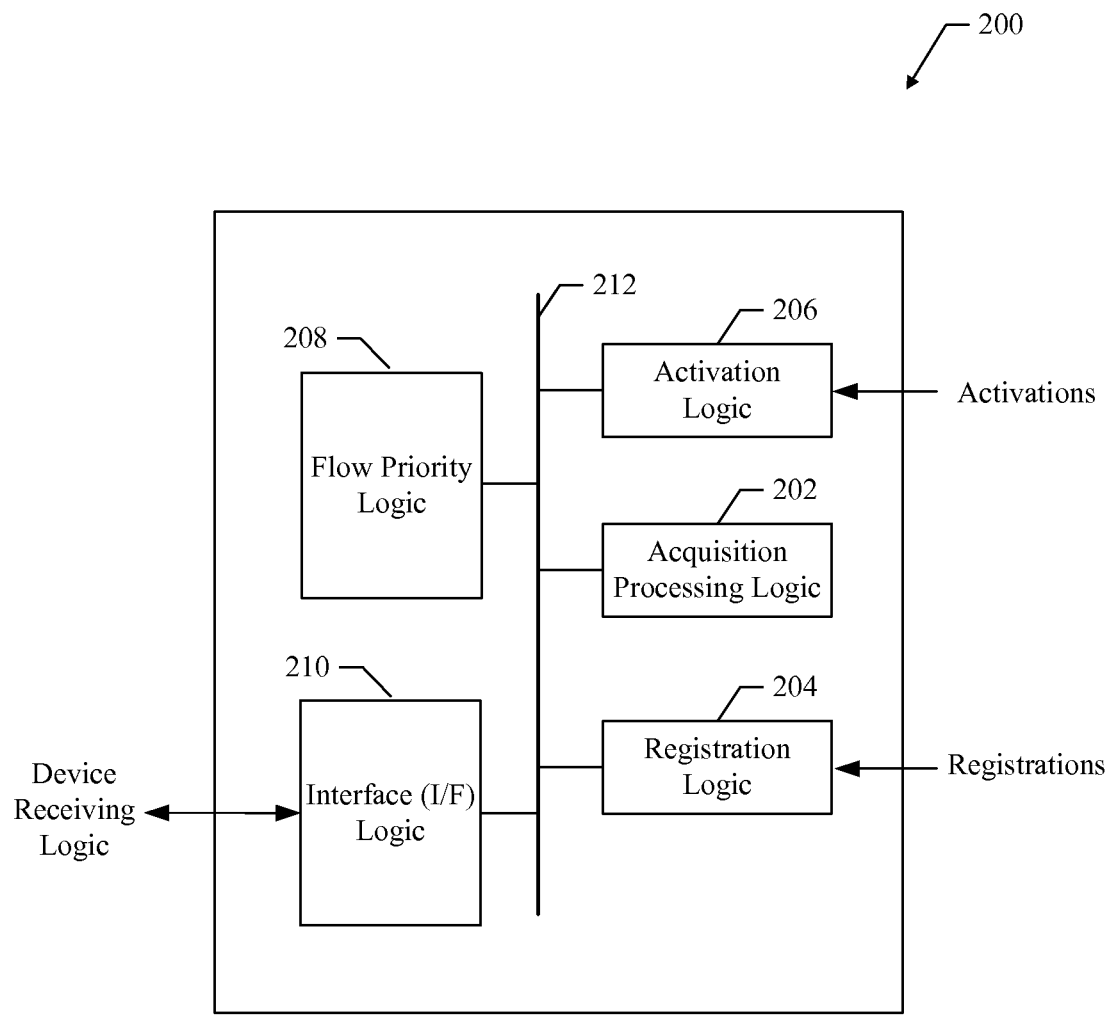
FIG. 2 shows exemplary flow data acquisition logic for use in aspects of a flow data acquisition system.

FIG. 2 shows exemplary flow data acquisition logic 200 for use in aspects of a flow data acquisition system. For example, the flow data acquisition logic 200 is suitable for use as the flow data acquisition logic 122 shown in FIG. 1. The flow data acquisition logic 200 comprises acquisition processing logic 202, registration logic 204, activation logic 206, flow priority logic 208, and interface (I/F) logic 210 all coupled to a data bus 212.

In an aspect, the registration logic 204 comprises at least one of a CPU, processor, gate array, hardware logic, memory elements, and/or hardware executing software. The registration logic 204 operates to receive registrations for non real time content flows from one or more applications at a device. For example, applications 124 at a device send registrations to the registration logic 204 to register to receive flow data associated with one or more non real time flows. The registrations are received by the registration logic 204 using any suitable messaging and/or signaling process and the registrations comprise any suitable format.

In an aspect, the activation logic 206 comprises at least one of a CPU, processor, gate array, hardware logic, memory elements, and/or hardware executing software. The activation logic 206 operates to receive activations for real time content flows from one or more applications at a device. For example, applications 124 at a device send activations to the activation logic 206 to immediately receive flow data associated with one or more real time flows. The activations are received by the activation logic 206 using any suitable messaging and/or signaling process and the activations comprise any suitable format.

In an aspect, the flow priority logic 208 comprises at least one of a CPU, processor, gate array, hardware logic, memory elements, and/or hardware executing software. The flow priority logic 208 operates to establish priorities for flow registrations and flow activations. A more detailed description of the operations performed by the flow priority logic 208 is provided below.

In an aspect, the acquisition processing logic 202 comprises at least one of a CPU, processor, gate array, hardware logic, memory elements, and/or hardware executing software. The acquisition processing logic 202 operates to execute one or more algorithms to process received registrations and activations so that flow data associated with real time and non real time flows may be received at the device. In an aspect, the acquisition processing logic 202 operates to group together flow registrations for one or more flows carried on the same RF so that flow data associated with non real time flows can be acquired efficiently and in a priority fashion and such that the acquisition of real time flows will not be interrupted. The acquisition processing logic 202 determines a list of activated flows and registered flows for flow data acquisition based on the algorithms executed for processing flow registrations and activations. A more detailed discussion of the operations of the acquisition processing logic 202 is provided below.

In an aspect, the interface logic 210 comprises at least one of a CPU, processor, gate array, hardware logic, memory elements, and/or hardware executing software. The interface logic 210 operates to allow the flow data acquisition logic 200 to communicate with device receiving logic to obtain distribution overhead information received as part of the control channels at the device. The interface logic 210 also operates to allow the flow data acquisition logic 200 to communicate with device receiving logic to request RF channel switches so that flow data may be acquired for activated flows and registered flows determined by the acquisition processing logic 202.

In an aspect, the flow data acquisition system comprises a computer program product comprising one or more program instructions ("instructions") or sets of "codes" stored or embodied on a machine-readable medium, which when executed by at least one processor, for instance, a processor at the acquisition processing logic 202, provides the functions described herein. For example, the sets of codes may be loaded into the flow data acquisition logic 200 from a machine-readable medium, such as a floppy disk, CDROM, memory card, FLASH memory device, RAM, ROM, or any other type of memory device or machine-readable medium that interfaces to the flow data acquisition logic 200. In another aspect, the sets of codes may be downloaded into the flow data acquisition logic 200 from an external device or network resource. The sets of codes, when executed, provide aspects of a flow data acquisition system as described herein.

Flow Priorities

In an aspect, the flow priority logic 208 operates to establish flow priorities associated with received flow registrations and flow activations. The flow priorities are assigned to prioritize how flow data is received and to support a level of QoS (Quality-of-Service) for application flows. In as aspect, the flow priorities are assigned in at least one of the following two ways.

1. Flow priorities are assigned at the application layer and passed down from applications to the flow data acquisition system. Flow priorities can be assigned statically by applications based on preconfigured priority data or flow priorities can be assigned dynamically by applications based on dynamic priority data received from the network.

2. Flow priorities are assigned at the flow data acquisition system. Again, the flow priorities can be assigned statically based on preconfigured priority data (e.g. based on flow types) or flow priorities can be assigned dynamically based on dynamic priority transmitted from the network as part of signaling information and received at the flow data acquisition system.

In an aspect, the flow priorities are statically assigned based on the following flow types with "0" being the highest priority.

| 1. | Real time flows | Priority 0 |
| 2. | Service Overhead flows | Priority 1 |
| 3. | File Delivery flows | Priority 2 |
| 4. | IP Datacast flows | Priority 3 |
| 5. | All other flow types | Priority 4 |

The real time flows are assigned highest priority due to their real time nature. The service overhead flows are assigned second highest priority as it is important at the device to acquire latest service overhead flow data to enable acquisition of available set of both real time and not real time flows. The IP Datacast flows are considered best effort delivery flows and hence are assigned lower priority than file delivery flow. In an aspect, the relative priority between file delivery and IP Datacast flows can be reversed using a preconfigured flag on the device.

In an aspect, more flow priority levels may be used to support finer granularity and/or QoS characteristics. The system may also support dynamic updates to the flow priorities.

Flow Activation

In an aspect, the system provides a flow activation mechanism to enable the immediate reception of flow data from the network for real time flows that are currently active. In an aspect, the activation logic 206 operates to provide the activation mechanism. A real time flow is considered active if it is present in distribution overhead information provided on a control channel of a received distribution waveform. An attempt to activate a non real time flow will fail.

In a vertical MFN, flow activation for multiple real time flows is allowed if a new activation identifies a real time flow that is carried on the same RF channel as already active real time flows. Thus, a proposed new activation will fail if it identifies a real time flow that is carried on a different RF channel than already active real time flows. In an aspect, a maximum limit is defined for the number of simultaneously activated real time flows, which provides efficiency and minimizes processing time. Any new real time flow activation that would exceed the maximum limit will fail.

Figure 3:
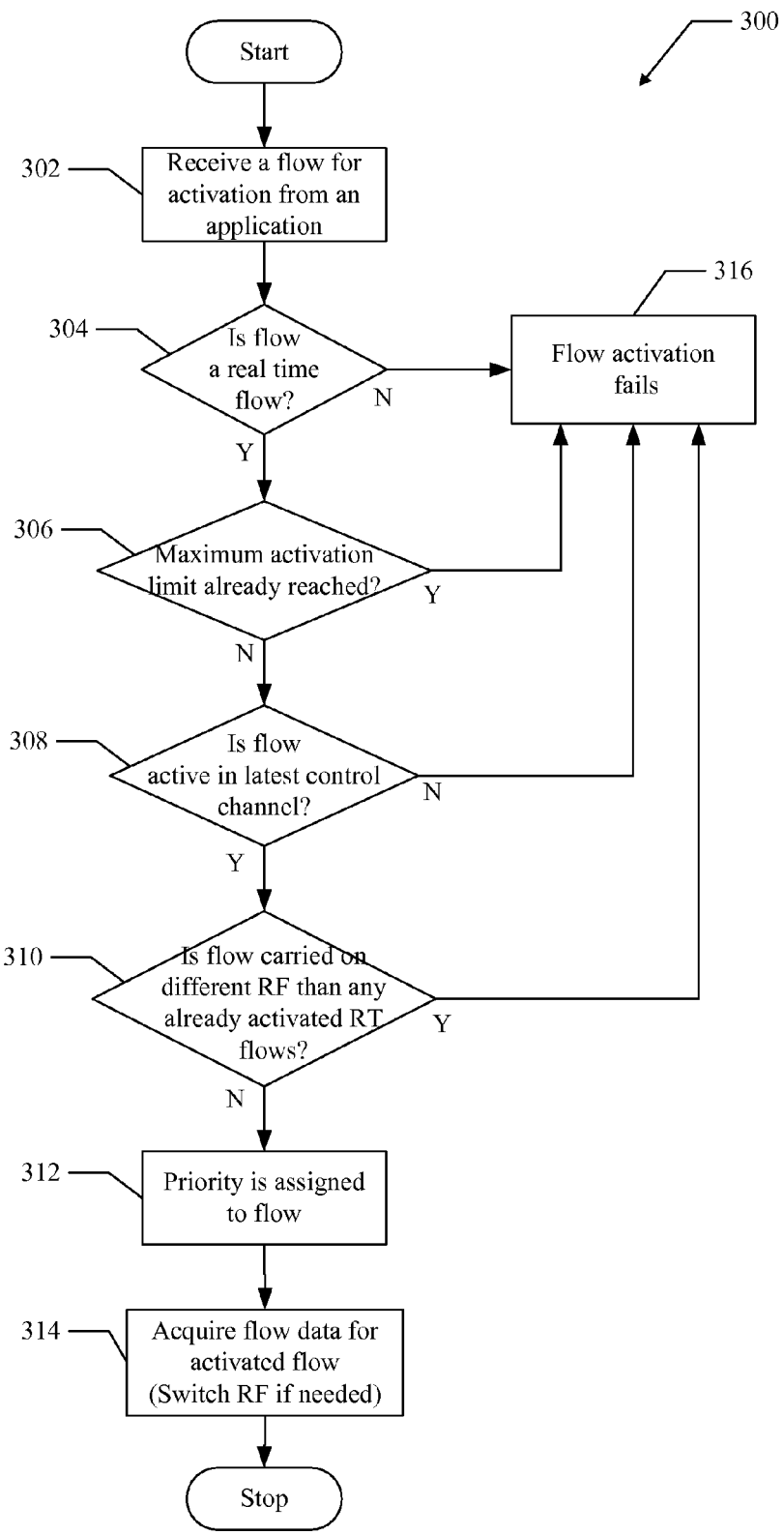
FIG. 3 shows an exemplary method for performing flow activations for use in aspects of a flow data acquisition system.

FIG. 3 shows an exemplary method 300 for performing flow activations for use in aspects of a flow data acquisition system. In an aspect, the method 300 is performed by the activation logic 206 shown in FIG. 2. For example, the activation logic 206 is located at a device and executes one or more sets of codes to perform the operations described below.

At block 302, a flow is received for activation. For example, in an aspect, the activation logic 206 receives a flow from an application for activation.

At block 304, a determination is made as to whether the received flow is a real time flow. In an aspect, the activation logic 206 determines whether the flow is a real time flow or a non real time flow. If the flow is a real time flow, the method proceeds to block 306. If the flow is a not a real time flow, the method proceeds to block 316.

At block 316, the flow activation fails. In an aspect, because the flow is not a real time flow, the activation logic 206 indicates to the application that the activation of the flow has failed. In addition, there are other reasons for activation failure. For example, if the maximum flow activation limit has been reached, then activation of a new flow will fail as determined at block 306. Also, if a flow is not active in the current control channel, then activation of a new real time flow will fail as determined at block 308. And, if a flow is carried on a different RF than any already activated flows, then activation of a new real time flow will fail as determined at block 310.

At block 306, a determination is made as to whether the maximum flow activation limit has been reached. For example, the activation logic 206 determines whether the number of flows already activated has reached a maximum based on any desired maximum limit. If the maximum limit has already been reached then the activation logic 206 fails any new flow activations. Thus, if the maximum limit has been reached, the method proceeds to block 316. If the maximum limit has not been reached, the method proceeds to block 308.

At block 308, a determination is made as to whether the flow is active as indicated in the latest overhead information received in a control channel. In an aspect, the activation logic 206 determines whether the flow is active or not active in the latest overhead information received in the control channel. The activation logic 206 may need to acquire the latest overhead data from the control channel (if not already acquired) before making this determination. For example, the activation logic 206 obtains the latest control channel data from the interface logic 210. If the flow is active, the method proceeds to block 310. If the flow is not active, the method proceeds to block 316.

At block 310, a determination is made as to whether the flow is carried on a different RF than any already activated real time flows. In an aspect, the activation logic 206 determines whether the flow is carried on a different RF. If the flow is carried on a different RF than any already activated real time flow, the method proceeds to block 316. If the flow is not carried on a different RF (i.e., carried on the same RF as any already activated real time flows), the method proceeds to block 312.

At block 312, a priority is assigned to the flow. In an aspect, the priority logic 208 operates to assign a priority to the real time flow as per the priority scheme in use as described above.

At block 314, the device attempts to acquire flow data for the newly activated flow. The device performs an RF switch if the real time flow is not carried on current RF. In an aspect, the acquisition processing logic 202 communicates with the Interface logic 210 to acquire flow data for the new real time flow.

Thus, the method 300 operates to provide activations for real time flows for use in aspects of a flow data acquisition system. It should be noted that the method 300 represents just one implementation and that other implementations are possible within the scope of the aspects.

Flow Registration

In an aspect, a flow registration mechanism is provided that allows applications to register flows to receive flow data transmitted from the network. For example, the registration logic 204 shown in FIG. 2 operates to provide the flow registration mechanism. In an aspect, the registration mechanism operates to allow applications to register flows for receiving flow data for non real time flows, which include, service overhead flows, file delivery flows, and IP datacast flows. In an aspect, the registration mechanism also operates to allow applications to de-register flows for which flow data has been received.

After receiving a flow registration, a priority is assigned based on the flow priority scheme in use. For example, the flow priority logic 208 operates to assign priorities to registered flows. The registration logic 204 maintains a list of registered flows and updates the registered flow list based on application initiated flow registrations and de-registrations. The acquisition processing logic 202 executes a registered flow data acquisition algorithm to receive data for the registered flows.

In an aspect, the registration logic 204 assigns a maximum limit to the number of flow registrations, which operates to increase speed and efficiency for processing flow registrations. An aggregated maximum limit is defined for all non real time flow categories (including service overhead flows, file delivery flows, and IP datacast flows) which provides flexibility to dynamically allocate registration limit among different flow categories. In an aspect, the registration logic 204 operates to notify the acquisition processing logic 202 regarding any registration activity that would affect the list of registered flows. When an application exits, all flows registered by that application are de-registered. In an aspect, if the maximum registration limit has been reached and a new registration is received, the registration logic 204 operates to perform one or more of the following operations.

1. If all existing registered flows have priorities equal to or higher than the proposed new flow registration, the new flow registration is failed.
2. If at least one existing registered flow has a lower priority than the proposed new flow registration, the new flow registration succeeds. In this case, the earliest registered (based on registration time) lowest priority flow is de-registered automatically and is removed from the registered flow list.

Figure 4:
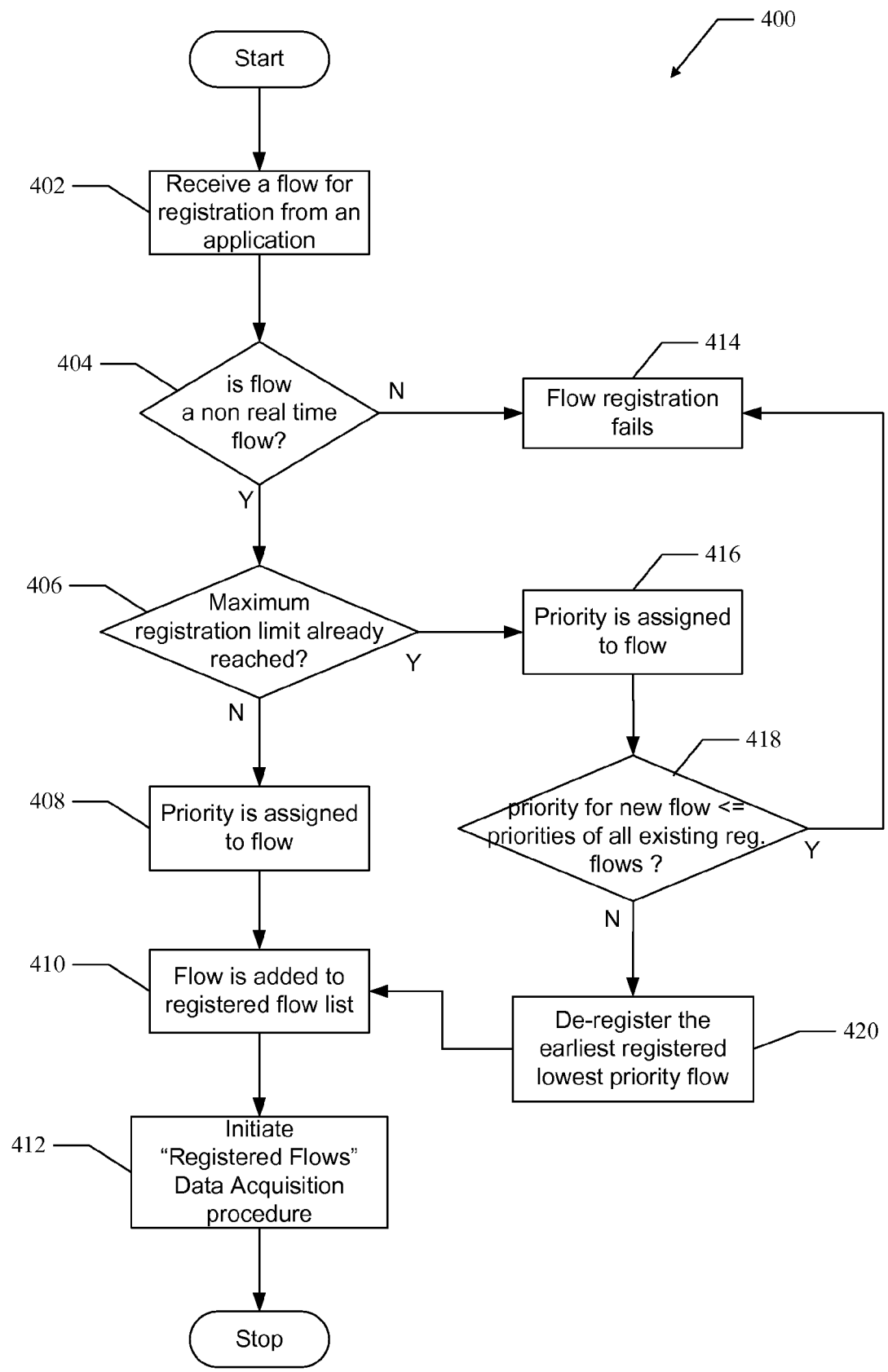
FIG. 4 shows an exemplary method for performing flow registrations for use in aspects of a flow data acquisition system.

FIG. 4 shows an exemplary method 400 for performing flow registrations in aspects of a flow data acquisition system. In an aspect, the method 400 is performed by the registration logic 204 shown in FIG. 2. For example, the registration logic 204 is located at a device and executes one or more sets of codes to perform the operations described below.

At block 402, a flow is received for registration. For example, in an aspect, the registration logic 204 receives a registration from an application executing at the device.

At block 404, a determination is made as to whether the submitted flow is one of the non real time flows. In an aspect, the registration logic 204 determines whether the flow is a non real time flow or a real time flow. If the flow is not a non real time flow, the method proceeds to block 414. If the flow is a non real time flow, the method proceeds to block 406.

At block 414, the flow registration fails. In an aspect, because the flow is not a non real time flow, the registration logic 204 indicates to the application that the registration of the flow has failed. Flow registrations may also fail if the maximum registration limit is already reached at the time of flow registration and there is no lower priority registered flow as captured at block 418.

At block 406, a determination is made as to whether the maximum flow registration limit has been reached. In an aspect, the registration logic 204 makes this determination. If the maximum registration limit has been reached the method proceeds to block 416. If the maximum registration limit has not been reached, the method proceeds to block 408.

At block 416, a priority is assigned to the flow. In an aspect, the priority logic 208 operates to assign a priority to the flow as per the priority scheme in use as described above.

At block 418, a determination is made as to whether all existing registered flows have priorities greater than or equal to the priority of the newly received flow. In an aspect, the flow priority logic 208 makes this determination. If the flow priority of the received flow is less than or equal to the priorities of all of the already registered flows, the method proceed to block 414. If the flow priority of the received flow is greater than the priorities of all of the already registered flows, the method proceeds to block 420.

At block 420, the earliest registered (based on registration time) and lowest priority flow is de-registered. In an aspect, the registration logic 204 operates to de-register this flow and remove the flow from the registered flow list.

At block 408, a priority is assigned to the new registered flow. In an aspect, the priority logic 208 operates to assign a priority to the new registered flow as per the priority scheme in use as described above.

At block 410, the new registered flow is added to a registered flow list. In an aspect, the registration logic 204 adds the flow to the registered flow list that is maintained at the device.

At block 412, a "Registered Flows" data acquisition procedure is initiated to acquire flow data for registered flows. In an aspect, the "Registered Flows" data acquisition procedure is performed by the acquisition processing logic 202. A more detailed description of the "Registered Flows" data acquisition procedure is provided below.

Thus, the method 400 operates to provide registrations for non real time flows for use in aspects of a flow data acquisition system. It should be noted that the method 400 represents just one implementation and that other implementations are possible within the scope of the aspects.

"Registered Flows" Data Acquisition

In various aspects, the system operates to perform a "Registered Flows" data acquisition algorithm for the purpose of acquiring flow data for registered flows. The acquisition processing logic 202 operates to perform the registered flow data acquisition algorithm that comprises the following procedures.

1. Preprocessing Procedure (PP)
2. Data Acquisition Procedure (DAP)

Preprocessing Procedure

In an aspect, the acquisition processing logic 202 performs a preprocessing procedure to process registered flows based on the latest distribution overhead information received in the control channel and flow priorities associated with registered flows. The preprocessing procedure generates an active flow set for registered flows. For example, the acquisition processing logic 202 maintains a list of registered flows that have been registered from various applications. All or a subset of the registered flows may be active in the network at any time. For example, a flow is considered active if it is present in distribution overhead information received in the control channel. A list of active flows is determined based on the distribution overhead information received over the control channel. Based on the distribution overhead information, the device can also determine which registered flows are available in current LOI. In an aspect, the active flow set defines a set of registered flows which are active and available in the current LOI.

Flow Groups

In an aspect, the acquisition processing logic 202 operates to aggregate registered flows together into flow groups (FG) for the purpose of flow data acquisition. The FGs are created to enable acquiring registered flow data in a prioritized fashion. The flow groups are generated by combining together flows from the active flow set that are carried on the same RF channel and have the same flow priority in a single FG. Thus, the acquisition processing logic 202 may generate one or more flow groups for any particular RF channel depending on the set of active flows carried over that RF channel. As per the FG definition, all flows associated with a FG will have same flow priority. In an aspect, each flow group is uniquely identified by a parameter pair comprising a flow priority level parameter and an RF channel identifier. The flow priority level specifies the priority of all flows associated with the given FG. An RF channel identifier specifies an identifier for the RF channel carrying the given FG. The flow group information is maintained for the current LOI and may be regenerated at any time. For example, after a handoff to a new LOI, the flow group information is regenerated. Also, after the set of flows is updated in the 'active flow set' because of updates to the list of active flows, the flow group information is regenerated.

Ranking

In an aspect, the acquisition processing logic 202 computes and assigns a unique ranking to each flow group. During the data acquisition procedure, the flow groups are examined by their ranking order. In an aspect, a flow group with a higher flow priority level is assigned a higher ranking than a flow group with a lower flow priority level. Among flow groups having the same priority level, flow groups having a larger number of flows are assigned a higher ranking than flow groups having a smaller number of flows. Among flow groups having the same flow priority level and same number of flows, the FG on the current RF channel is assigned higher rank, and then FG ranking is assigned based on RF channel ID (e.g. FG carried on lower RF channel ID is assigned higher rank). The acquisition processing logic 202 performs the following process to assign rankings with rank '0' being the highest rank.

1. The flow group with the higher flow priority level is assigned a higher rank than a flow group with a lower flow priority level.
2. If two or more flow groups have the same flow priority level, the flow group comprising more number of flows is assigned a higher rank.
3. If two or more flow groups have the same priority level and the same number of flows, first the FG on the current RF channel is assigned higher rank, and then ranking is assigned based on the RF channel ID (e.g. FG carried on lower RF channel ID is assigned higher rank).

Figure 5:
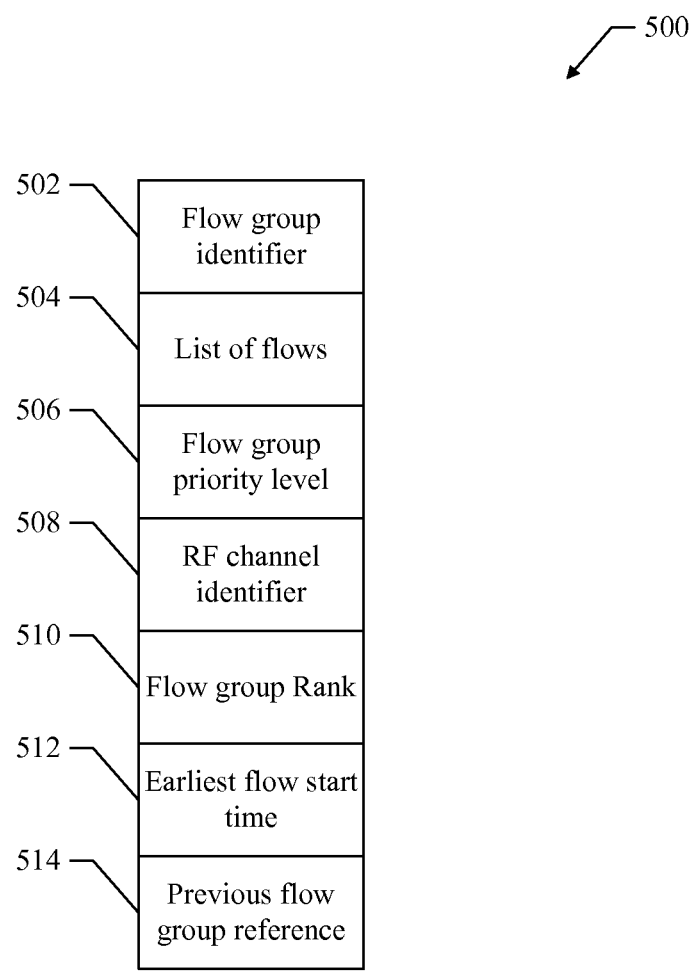
FIG. 5 illustrates exemplary flow group parameters for use in aspects of a flow data acquisition system.

FIG. 5 illustrates exemplary flow group parameters 500 for use in aspects of a flow data acquisition system. In an aspect, the flow group parameters 500 are generated by the acquisition processing logic 202. The flow group parameters 500 comprise a flow group identifier 502 that identifies a flow group. A list of flows 504 is provided that comprises a list of flows associated with the flow group. A flow group priority level 506 provides a priority level assigned to flows associated with the flow group. An RF channel identifier 508 identifies the RF channel associated with the RF frequency carrying flows associated with the flow group. A flow group rank 510 provides a rank assigned to the flow group as described above.

The flow group parameters 500 also comprise an earliest flow start time parameter 512 which identifies the earliest flow start time among all flows associated with the flow group. In an aspect, this parameter is determined based on distribution overhead information received in transmission frames and is specified as absolute time in seconds. A previous flow group reference parameter 514 is provided that specifies a flow group which has the minimum earliest flow start time among all flow groups having a rank higher than the identified flow group. The earliest flow start time parameter 512 and the previous flow group reference parameter 514 are computed during the data acquisition procedure described below.

Figure 6:
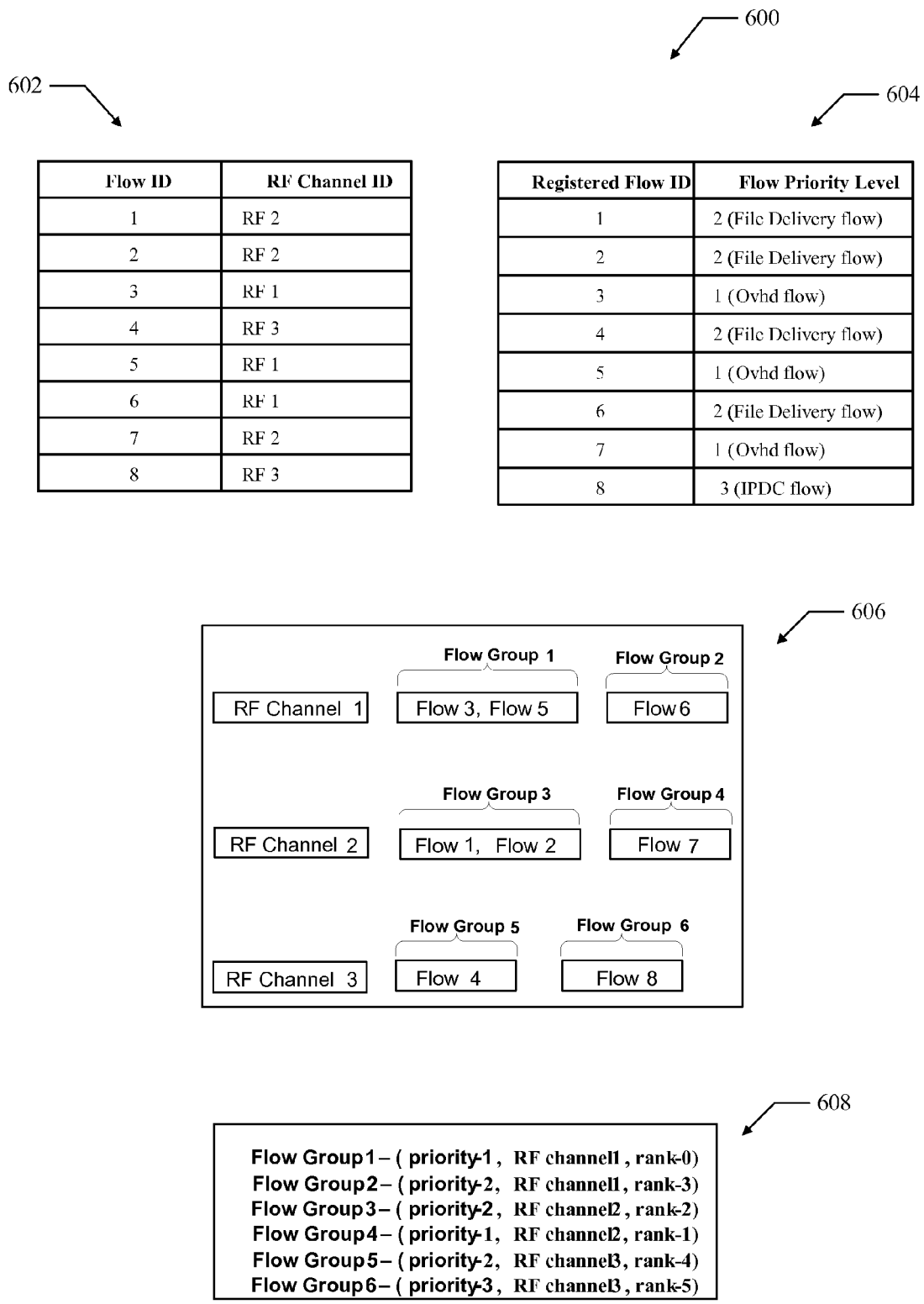
FIG. 6 shows a preprocessing example that illustrates aspects of a flow data acquisition system.

FIG. 6 shows a preprocessing procedure example 600 that illustrates aspects of a flow data acquisition system. In an aspect, preprocessing procedure as illustrated in the example 600 is provided by the flow data acquisition logic 200 shown in FIG. 2.

Flow distribution information 602 is shown that identifies flows and their associated RF channel identifiers. In an aspect, the distribution information 602 is generated by the aggregation logic 104 shown in FIG. 1 and provided to devices as part of the distribution overhead in the transmission frame. For example, the distribution information 602 is provided to the device 118 as part of distribution overhead in transmission frames 114 and 116 in LOI. Applications executing at the device 118 operate to register one or more identified flows as described above. In an aspect, when a flow is registered, a priority is assigned and it is added to a list of registered flows 604. The list of registered flows 604 illustrates the flows that have been registered using the registration process described above. Each registered flow is associated with a flow ID and a flow priority level. It should be noted that the registered flows shown in the list of registered flows 604 are all non real time flows.

Based on the list of registered flows 604 and the flow distribution information 602, the flows are grouped together into FGs. For example, the flows are grouped by RF channel and flow priority level as described above to form the flow groups shown at 606. In an aspect, the acquisition processing logic 202 operates to determine the flow groupings. For example, the flow group 1 comprises those flows located on RF channel 1 which have flow priority 1 and flow group 2 comprises those flows located on RF channel 1 which have flow priority 2.

Once the flow groupings 606 are determined, the flow groups are ranked as illustrated at 608. In an aspect, the acquisition processing logic 202 operates to rank the flow groups based on the associated flow priority level and number of flows in the flow group as described by ranking scheme above. From the rankings at 608 it can be seen that flow group 1 is assigned a higher rank than flow group 4 because flow group 1 contains more flows than flow group 4. It can also be seen that between the flow groups 2, 3, and 5, the flow group 3 is assigned the highest rank because it contains the largest number of flows. Furthermore, between the flow groups 2 and 5, the flow group 2 is assigned a higher rank because flow group 2 is carried on a lower RF channel ID (RF1) than the flow group 5 (which is carried on RF3). The current RF is assumed to be RF2. The flow group 6 is assigned the lowest ranking as it is associated with lowest flow priority level.

Thus, the example, 600 illustrates how aspects of a flow data acquisition system operate to determine flow priorities, generate flow groups, and determine rankings of the flow groups. It should be noted that the operation of the flow data acquisition system is not limited to the aspects illustrated in the example 600.

Data Acquisition Procedure

Once flow groups are generated for the active flow set the data acquisition procedure (DAP) operates to receive the flow data for registered flows. The following parameters are generated by the acquisition processing logic 202 for each flow group as part of the data acquisition procedure.

1. Earliest Flow Start (erl_fs): This parameter specifies the earliest flow start time among all flows associated with a flow group. The flow start time for a given flow refers to the time when network starts flow data transmission for that flow. In an aspect, this parameter is specified as absolute time in seconds granularity. This field is computed based on distribution overhead information received in the transmission frame. This field is denoted by FG[i].erl_fs for an $i^{th}$ FG.

2. Previous Flow Group (prev_FG): This parameter specifies a flow group which has the minimum earliest flow start time among all flow groups which have rank higher than a given flow group. This parameter specifies a higher rank FG which can preempt data acquisition for a given flow group.

Following configuration parameters are used as part of the data acquisition procedure.

1) Time Threshold1 (Time_Thresh1): This parameter defines a time gap threshold in seconds for the purpose of switching between RF channels (e.g. to account for RF switch and processing overhead) to receive flow data for flows belonging to different flow groups. This parameter is used to determine when to consider lower rank FGs for flow data acquisition. If erl_fs for a higher rank FG is more than Time_Thresh1 seconds in the future, FPS will consider lower rank FGs for data acquisition. This ensures optimal flow data acquisition as flow data will be acquired for a lower rank FG when there is a higher rank FG which starts in future.

2) Time Threshold2 (Time_Thresh2): This parameter is used to determine when to actually select a lower rank FG for data acquisition. If a lower rank FG starts before a higher rank FG and the time gap between erl_fs for these two FGs is more than Time_Thresh2 seconds (e.g. to account for processing overhead), the lower rank FG will be selected for flow data acquisition. The Time_Thresh2 parameter should be smaller than the Time_Thresh1 parameter. This ensures optimal flow data acquisition as a data for a lower rank FG is only acquired if there is sufficient time left before the start of a higher rank FG to account for processing overhead.

Figure 7:
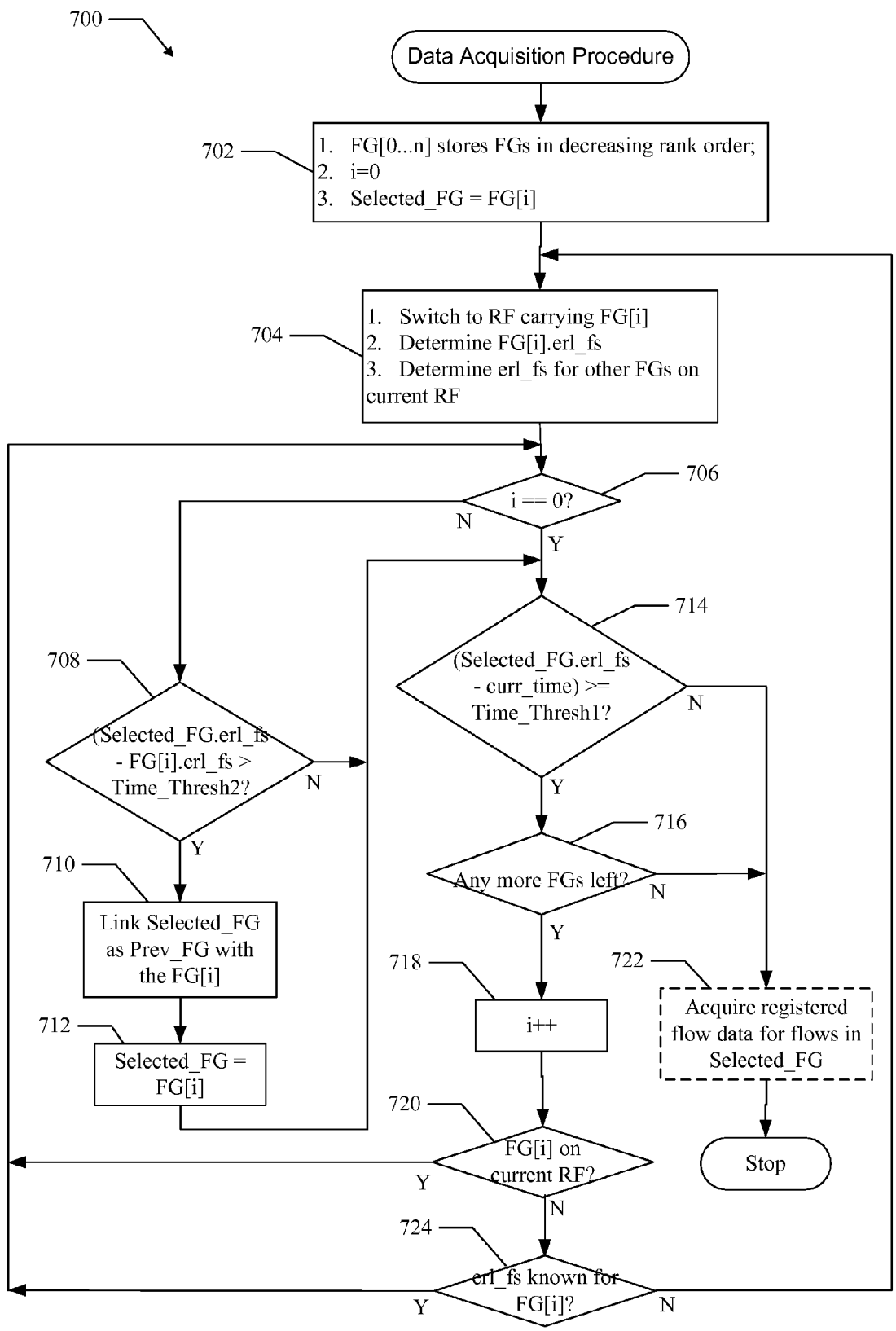
FIG. 7 shows a method for providing an acquisition procedure for use in aspects of a flow data acquisition system.

FIG. 7 shows a method 700 for providing a data acquisition procedure (DAP) for use in aspects of a flow data acquisition system. In an aspect, the method 700 is performed by the acquisition processing logic 202. For example, in an aspect, the acquisition processing logic 202 executes one or more sets of codes to perform the functions described below.

At block 702, flow groups (FGs) are stored in the FG[. . ] list in their decreasing rank order. A flow group with the highest rank is selected as the first FG for acquiring registered flow data by assigning a Selected_FG parameter to FG[0]. In an aspect, the acquisition processing logic 202 operates to store flow groups in the FG[. . ] list in decreasing rank order, set an index (i) to zero and select the highest rank flow group for acquiring flow data.

At block 704, an RF switch is performed to switch to the RF channel carrying the FG[i]. In an aspect, the acquisition processing logic 202 operates to control the interface logic 210 to communicate an RF channel switch to receiving logic at a device. The acquisition processing logic 202 also operates to determine the erl.fs parameter for the FG[i] and determine the erl.fs parameter for other flow groups carried on the current RF.

At block 706, a determination is made as to whether the index (i) is equivalent to zero. This is done to determine if the current FG[i] is the highest rank flow group. In an aspect, the acquisition processing logic 202 operates to make this determination. If the index (i) is equal to zero (i.e. FG[i] is the highest rank FG), the method proceeds to block 714. If the index (i) is not equivalent to zero (i.e. FG[i] is not the highest rank FG), the method proceeds to block 708.

At block 714, a determination is made as to whether the earliest flow start for the flow group identified by the Selected_FG is at least Time_Thresh1 seconds in future by evaluating following expression.

Selected_FG.erl_fs−current time>=Time_Thresh1

In an aspect, the acquisition processing logic 202 makes this determination. If the expression is false, the method proceeds to block 722. If the expression is true, the method proceeds to block 716.

At block 722, flow data is acquired for registered flows in the Selected_FG on the current RF. The flow data is also acquired for registered flows associated with other FGs carried on the current RF to optimize flow data acquisition. In an aspect, the acquisition processing logic 202 operates to communication through the interface logic 210 to receiving logic at a device to receive the flow data for registered flows. The method 800 below provides details of the operations performed at block 722 for acquiring flow data for registered flows in the Selected_FG and other FGs on the current RF.

At block 716, a determination is made as to whether there are any more flow groups left to process in the FG[. . ] list. In an aspect, the acquisition processing logic 202 operates to make this determination. If there are no more flow groups left to process in the FG[. . ] list, the method proceeds to block 722. If there are more flow groups left to process in the FG[. . ] list, the method proceeds to block 718.

At block 718, the index (i) is incremented for processing the next flow group in the ranked FG[. . ] list. In an aspect, the acquisition processing logic 202 operates to increment the index (i) to process the next flow group.

At block 720, a determination is made as to whether the next flow group (FG[i]) is on the current RF. In an aspect, the acquisition processing logic 202 operates to make this determination. If the next flow group (FG[i]) is not on the current RF, the method proceeds to block 724. If the next flow group (FG[i]) is on the current RF, the method proceeds to block 706.

At block 724, a determination is made as to whether the erl_fs time is know for the next FG (FG[i]). In an aspect, the acquisition processing logic 202 operates to make this determination. If the erl_fs is known for FG[i], the method proceeds to block 706. If the erl_fs is not known for FG[i], the method proceeds to block 704.

At block 708, a determination is made as to whether the time difference between the earliest flow start for the selected flow group (Selected_FG) and current $i^{th}$ rank FG (FG[i]) is greater than the Time_Thresh2 time duration by evaluating the following expression.

Selected_FG.erl_fs−FG[i].erl_fs>Time_Thresh2

In an aspect, the acquisition processing logic 202 makes this determination. If the expression is false, the method proceeds to block 714. If the expression is true, the method proceeds to block 710.

At block 710, the current Selected_FG is linked with the $i^{th}$ rank FG (FG[i]) as previous flow group for FG[i]. In an aspect, the acquisition processing logic 202 performs this linking process by setting the previous flow group reference (prev_FG) parameter 516 associated with the FG[i] to the Selected_FG.

At block 712, the selected flow group is set to FG[i]. In an aspect, the acquisition processing logic 202 makes this setting. The method then proceeds to block 714.

Thus, the method 700 operates to provide an aspect of a flow data acquisition system for acquiring flow data for registered flows. It should be noted that the method 700 represents just one implementation and that other implementations are possible within the scope of the aspects.

Figure 8:
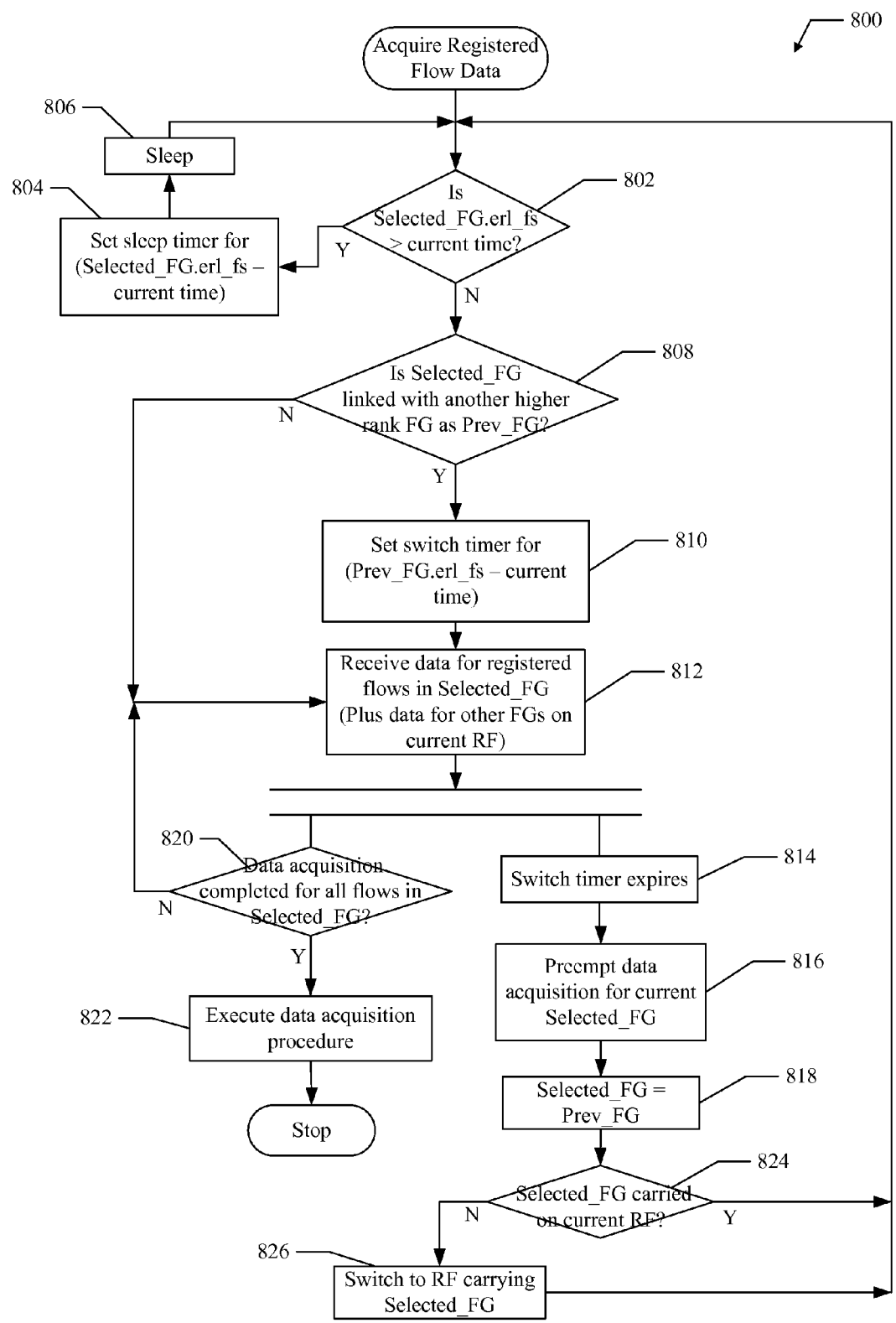
FIG. 8 shows a method for acquiring flow data for use in aspects of a flow data acquisition system.

FIG. 8 shows a method 800 for acquiring flow data for use in aspects of a flow data acquisition system. For example, the method 800 is suitable for use at block 722 of the method 700. In an aspect, the method 800 is performed by the acquisition processing logic 202. For example, in an aspect, the acquisition processing logic 202 executes one or more sets of codes to perform the functions described below.

At block 802, a determination is made as to whether or not the earliest flow start time (erl_fs) of the selected flow group (Selected_FG) is in the future (i.e. greater than the current time). In an aspect, the acquisition processing logic 202 makes this determination. If the earliest flow start time of the Selected_FG is in the future then the method proceeds to block 804. If the earliest flow start time of the Selected_FG is not in the future then the method proceeds to block 808.

At block 804, a sleep timer is set with a value equal to the difference between the erl.fs of the selected flow group and the current time. In an aspect, the acquisition processing logic 202 maintains a sleep timer and sets this value in the timer. At block 806, the system sleeps until the sleep timer expires and then the method proceeds to block 802.

At block 808, a determination is made as to whether the selected flow group is linked with another higher ranked FG as Prev_FG. In an aspect, the acquisition processing logic 202 makes this determination. A FG gets linked with another higher rank FG as Prev_FG as part of data acquisition procedure (DAP) at block 710. If the selected flow group is linked with another higher ranked Prev_FG the method proceeds to block 810. If the selected flow group is not linked with another higher ranked Prev_FG the method proceeds to block 812.

At block 810, a switch timer is set to a value equal to (Prev_FG.erl_fs−current time) which indicates the difference between the earliest start time of the Prev_FG and the current time. In an aspect, the acquisition processing logic 202 maintains a switch timer and sets this value in the timer. The purpose of the switch timer is to enable switching to the RF channel carrying the Prev_FG (if different than current RF channel) and to allow data to be acquired for flows in the higher rank Prev_FG whenever the earliest flow start time for that FG becomes current.

At block 812, flow data is received for registered flows in the selected flow group. The flow data is also received for registered flows associated with other FGs carried on the current RF to optimize flow data acquisition. In an aspect, the acquisition processing logic 202 controls the interface logic 210 to receive the flow data for registered flows.

From this point forward, the method 800 proceeds in a parallel fashion. For example, the operations at blocks 820 and 822 may be performed in parallel with the operations at blocks 814, 816, 818, 824 and 826.

At block 820, a determination is made as to whether data acquisition is completed for all flows in the selected flow group. In an aspect, the acquisition processing logic 202 makes this determination. If the data has been acquired for all flows in the Selected_FG, the method proceeds to block 822. If the data has not been acquired for all flows in the Selected_FG the method proceeds to block 812.

At block 822, the device executes the data acquisition procedure (DAP) as captured in method 700 to acquire flow data for registered flows associated with other flow groups.

At block 814, the switch timer expires. For example, the switch timer set at block 810 by the acquisition processing logic 202 expires. The expiry of switch timer will cause preemption of data acquisition for the current Selected_FG and will initiate data acquisition for the higher rank Prev_FG linked with the current Selected_FG.

At block 816, data acquisition for the current selected flow group is preempted. In an aspect, the acquisition processing logic 202 communicates with receiving logic at the device using the interface logic 210 to cause the receiving logic to preempt the reception of data associated with the current flow group.

At block 818, the selected flow group is updated and set to the Prev_FG linked with the old Selected_FG. In an aspect, the acquisition processing logic 202 makes this setting.

At block 824, a determination is made as to whether the updated selected flow group is carried on the current RF. In an aspect, the acquisition processing logic 202 makes this determination. If the updated selected flow group is carried on the current RF, the method proceeds to block 802. If the updated selected flow group is not carried on the current RF, the method proceeds to block 826.

At block 826, an RF switch is performed to switch to the RF channel carrying the updated Selected_FG. In an aspect, the acquisition processing logic 202 operates to control the interface logic 210 to communicate an RF channel switch to receiving logic at a device. The method then proceeds to block 802.

Thus, the method 800 operates to acquire flow data for registered flows in aspects of a flow data acquisition system. It should be noted that the method 800 represents just one implementation and that other implementations are possible within the scope of the aspects.

In an aspect, a device may execute the data acquisition procedure (DAP) described above under one or more of the following conditions.

1. When decoding only registered flow data and flow data acquisition is completed for all flows in the Selected_FG (as captured in block 820 shown in FIG. 8). This can happen due to one or more of the following reasons.
   a. Registered flows in Selected_FG get de-registered by applications.
   b. Registered flows in Selected_FG get removed from the control channel.
   c. The erl_fs for the Selected_FG is now greater than the current time.
2. When decoding activated flows and all activated flows get deactivated.
3. When not decoding any flow currently and a new flow gets registered and is active (i.e. present in the distribution overhead received in control channel).
4. When decoding registered flow data currently and a higher priority or same priority flow (with respect to the Selected_FG) gets registered and is active (i.e. present in the distribution overhead received in control channel).

Figure 9:
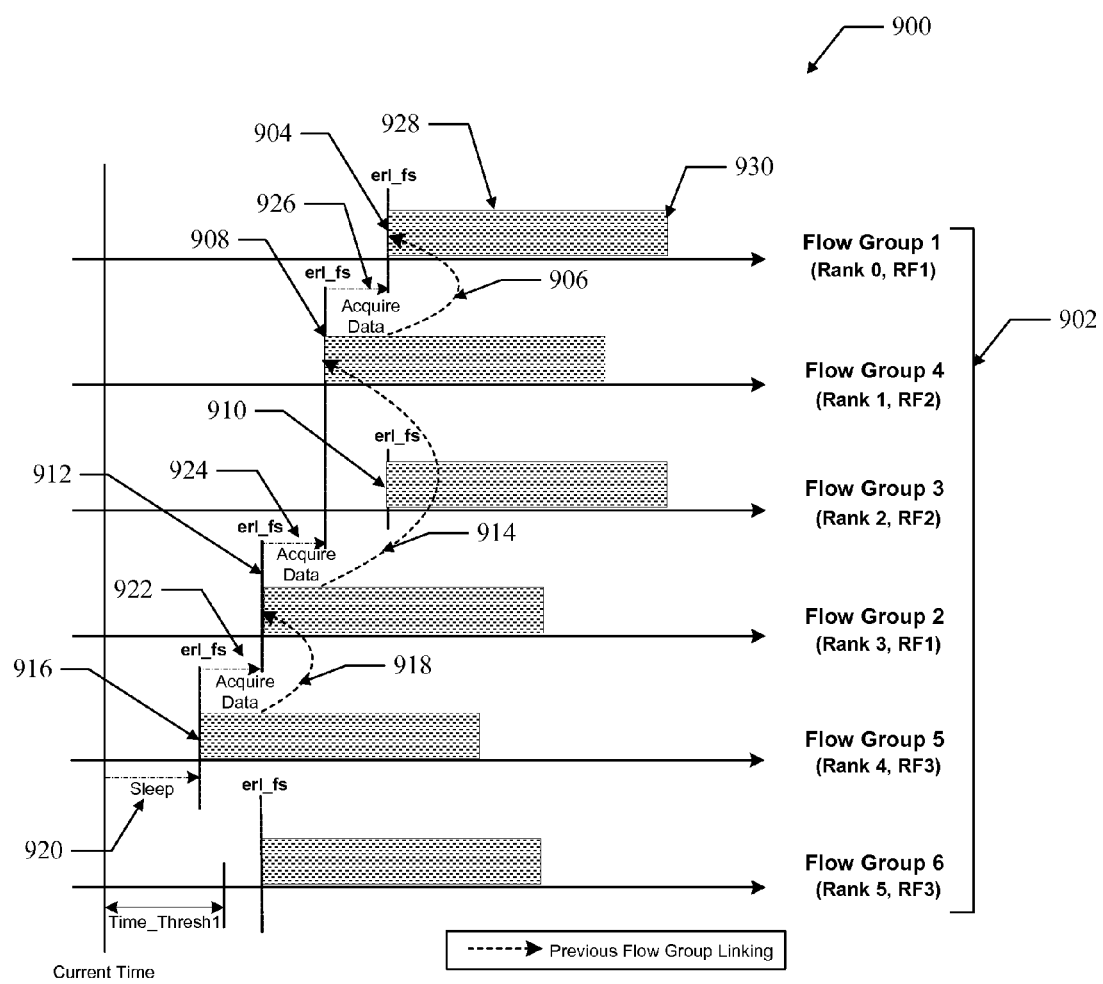
FIG. 9 shows graphs that illustrate the operation of a data acquisition procedure for use in aspects of a flow data acquisition system.

FIG. 9 shows graphs 900 that illustrate operations of a data acquisition procedure for use in aspects of a flow data acquisition system. In various aspects, a device comprising the flow data acquisition logic 200 operates to perform operations for the data acquisition procedure as illustrated in the methods shown in FIG. 7 and FIG. 8. For clarity, the graphs 900 illustrate the operation of the data acquisition procedure for the same set of flow groups as provided in the preprocessing procedure example 600.

The list of flow groups, their assigned ranks and associated RF channel are shown at 902. The flow groups are listed in their decreasing rank order. For example the highest rank flow group 1 (rank 0) is listed first, followed by next highest rank flow group 4 (rank 1) which is followed by flow group 3, flow group 2, flow group 5 and flow group 6 in that order.

The procedure starts with the highest rank flow group 1 and selects that as the Selected_FG. The device switches to RF1 carrying the Selected_FG and determines the earliest flow start time (erl_fs) for the Selected_FG and also for flow group 2 (i.e. all flow groups carried on RF1). The erl_fs for the Selected_FG, shown at 904, is more than Time_Thresh1 seconds in the future. The device then examines the next highest rank flow group 4.

The device switches to RF2 carrying the next highest rank flow group 4 and determines the earliest flow start time (erl_fs) for flow group 4 and also for flow group 3 (i.e. all flow groups carried on RF2). The difference between the erl_fs of the current Selected_FG (flow group 1) and flow group 4 is greater than Time_Thresh2. The device links flow group 1 as the Prev_FG for flow group 4 as shown at 906, and then selects flow group 4 as new updated Selected_FG. The erl_fs for current Selected_FG (flow group 4) is more than Time_Thresh1 seconds in future. The device examines the next highest rank flow group 3 which is carried on the same RF (RF2). The difference between erl_fs of the current Selected_FG (flow group 4) and flow group 3 is not greater than Time_Thresh2 because flow group 3 has an erl_fs after flow group 4 as shown at 910. The device does not update the Selected_FG. The device then examines the next highest rank flow group 2.

The erl_fs for flow group 2, shown at 912, has been already determined. The difference between erl_fs of the current Selected_FG (flow group 4) and flow group 2 is greater than Time_Thresh2. The device links flow group 4 as the Prev_FG for flow group 2 as shown at 914, and then selects flow group 2 as the new updated Selected_FG. The erl_fs for the current Selected_FG (flow group 2) is more than Time_Thresh1 seconds in the future. The device then examines the next highest rank flow group 5.

The device switches to RF3 carrying next highest rank flow group 5 and determines the earliest flow start time (erl_fs) for flow group 5 and also for flow group 6 (i.e. all flow groups carried on RF3). The difference between erl_fs of the current Selected_FG (flow group 2) and flow group 5 is greater than Time_Thresh2. The device links flow group 2 as the Prev_FG for flow group 5 as shown at 918, and then selects flow group 5 as the new updated Selected_FG. The erl_fs for the current Selected_FG (flow group 5) is less than Time_Thresh1 seconds in the future. The device now attempts to acquire flow data for flows in flow group 5 on RF3.

The device sets a sleep timer for the time difference between erl_fs of the Selected_FG (flow group 5) and the current time as shown at 920. The device wakes up when the sleep timer expires. The device then sets a switch timer for the time difference between erl_fs of the Prev_FG (flow group 2) of current Selected_FG and the current time. The device then acquires data for flows in the Selected_FG (flow group 5) as shown at 922. When the switch timer expires, the device preempts data acquisition for the current Selected_FG (flow group 5) and sets the updated Selected_FG to the Prev_FG (flow group 2).

The device switches to RF1 carrying the updated Selected_FG (flow group 2). The device then sets a switch timer for the time difference between erl_fs of the Prev_FG (flow group 4) of the current Selected_FG and the current time. The device then acquires data for flows in the Selected_FG (flow group 2) as shown at 924. When the switch timer expires, the device preempts data acquisition for the current Selected_FG (flow group 2) and sets the updated Selected_FG to the Prev_FG (flow group 4).

The device switches to RF2 carrying the updated Selected_FG (flow group 4). The device then sets a switch timer for the time difference between erl_fs of the Prev_FG (flow group 1) of the current Selected_FG and the current time. The device then acquires data for flows in the Selected_FG (flow group 4) as shown at 926. When the switch timer expires, the device preempts data acquisition for the current Selected_FG (flow group 4) and sets the updated Selected_FG to the Prev_FG (flow group 1).

The device then switches to RF1 carrying the updated Selected_FG (flow group 1). Since flow group 1 does not have any Prev_FG linked, the device does not set up the switch timer. The device starts acquiring data for flows in the current Selected_FG (flow group 1) as shown at 928. Once flow data acquisition is completed for flows in the Selected_FG (flow group 1) as shown at 930, the device executes the DAP procedure again to acquire data for registered flows in other flow groups.

Thus, the data acquisition procedure operates to acquire flow data for linked flow groups according to their respective erl_fs times. It should be noted that minor adjustments, rearrangements, additions and deletions to the operation of the data acquisition procedure illustrated in FIG. 9 are within the scope of the described aspects.

In various aspects, the acquisition processing logic 202 operates to perform flow data acquisition for activated real time flows. In an aspect, the acquisition processing logic 202 operates to give highest priority to data acquisition for real time flows. The acquisition processing logic 202 preempts data acquisition for other registered non real time flows if a real time flow is activated and an RF channel switch is required to acquire the real time data.

Figure 10:
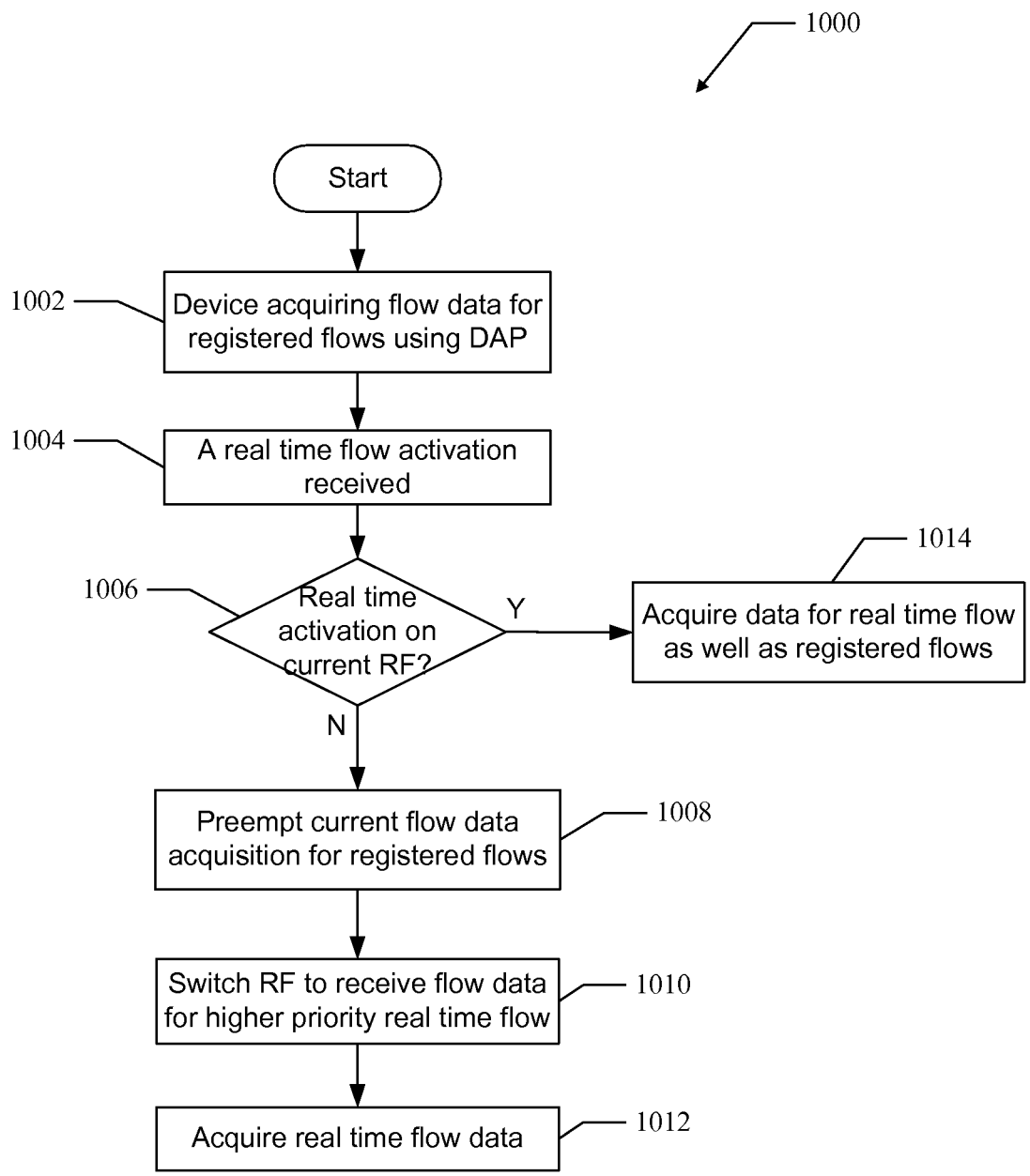
FIG. 10 shows a method for providing an acquisition procedure for use in aspects of a flow data acquisition system.

FIG. 10 shows a method 1000 for providing a data acquisition procedure for use in aspects of a flow data acquisition system. In an aspect, the method 1000 is performed by the acquisition processing logic 202 to acquired flow data associated with real time flows. For example, in an aspect, the acquisition processing logic 202 executes one or more sets of codes to perform the functions described below.

At block 1002, device is acquiring flow data for registered flows using the data acquisition procedure described above.

At block 1004, activation for a real time flow is received. In an aspect, an application submits a flow activation request to the activation logic 206 to immediately receive the flow data associated with the real time flow.

At block 1006, a determination is made as to whether the real time flow associated with the activation is available on the current RF. In an aspect, the acquisition logic 202 makes this determination. If the real time flow is available on the current RF, the method proceeds to block 1014, if not, then the method proceeds to block 1008.

At block 1014, the activated real time flow is acquired from the current RF along with other registered flows that are available on the current RF. In an aspect, the acquisition logic 202 operates to acquire the activated and registered flows on the current RF.

At block 1008, the flow data acquisition for registered flows is preempted on the current RF. In an aspect, the acquisition processing logic 202 operates to communicate with the interface logic 210 to preempt the flow data acquisition for registered flows.

At block 1010, an RF switch is performed to switch to the RF channel carrying new activated real time flow to receive flow data associated with the higher priority real time flow. In an aspect, the acquisition processing logic 202 operates to communicate with the interface logic 210 at to request an RF switch to receive real time flow data associated with the higher priority activation.

At block 1012, the device acquires flow data for new real time flow.

Thus, the method 1000 operates to acquire flow data associated with real time flows in aspects of a flow data acquisition system. It should be noted that the method 1000 represents just one implementation and that other implementations are possible within the scope of the aspects.

Figure 11:
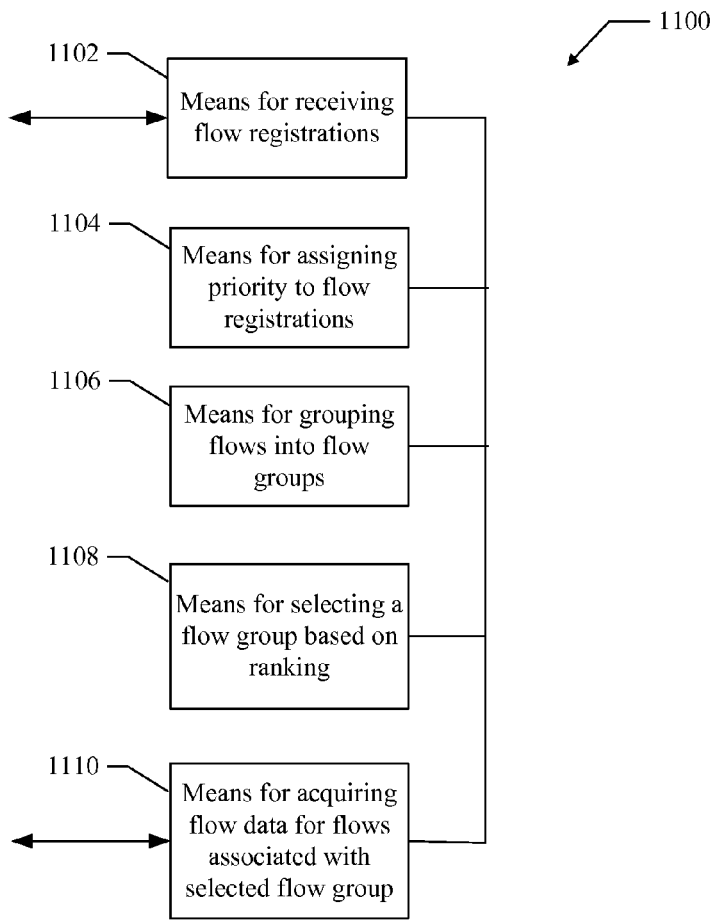
FIG. 11 shows exemplary flow data acquisition logic for use in aspects of a flow data acquisition system.

FIG. 11 shows exemplary flow data acquisition logic 1100 for use in aspects of a flow data acquisition system. For example, the flow data acquisition logic 1100 is suitable for use as the flow data acquisition logic 200 shown in FIG. 2. In an aspect, the flow data acquisition logic 1100 is implemented by at least one integrated circuit comprising one or more modules configured to provide aspects of a flow data acquisition system as described herein. For example, in an aspect, each module comprises hardware, and/or hardware executing software.

The flow data acquisition logic 1100 comprises a first module comprising means (1102) for receiving one or more flow registrations associated with one or more flows, respectively, which in an aspect comprises the registration logic 204. The flow data acquisition logic 1100 also comprises a second module comprising means (1104) for assigning a priority to each of the one or more flow registrations, which in an aspect comprises the flow priority logic 208. The flow data acquisition logic 1100 also comprises a third module comprising means (1106) for grouping the one or more flows into flow groups based on the associated priority and RF channels carrying the one or more flows, wherein each flow group is assigned a ranking, which in an aspect comprises the acquisition processing logic 202. The flow data acquisition logic 1100 also comprises a fourth module comprising means (1108) for selecting a selected flow group based on the ranking, which in an aspect comprises the acquisition processing logic 202. The flow data acquisition logic 1100 also comprises a fifth module comprising means (1108) for acquiring flow data for the flows associated with the selected flow group, which in an aspect comprises the acquisition processing logic 202.

Figure 12:
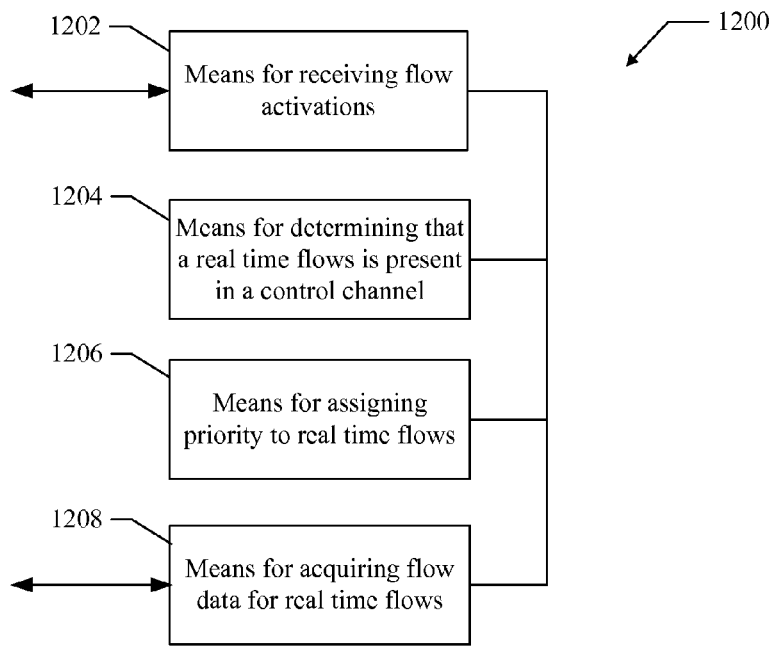
FIG. 12 shows exemplary flow data acquisition logic for use in aspects of a flow data acquisition system.

FIG. 12 shows exemplary flow data acquisition logic 1200 for use in aspects of a flow data acquisition system. For example, the flow data acquisition logic 1200 is suitable for use as the flow data acquisition logic 200 shown in FIG. 2. In an aspect, the flow data acquisition logic 1200 is implemented by at least one integrated circuit comprising one or more modules configured to provide aspects of a flow data acquisition system as described herein. For example, in an aspect, each module comprises hardware, and/or hardware executing software.

The flow data acquisition logic 1200 comprises a first module comprising means (1202) for receiving one or more activations associated with one or more real time flows, respectively, which in an aspect comprises the activation logic 206. The flow data acquisition logic 1200 also comprises a second module comprising means (1204) for determining that the one or more real time flows are present in a current control channel, which in an aspect comprises the activation logic 206. The flow data acquisition logic 1200 also comprises a third module comprising means (1206) for assigning a priority to each of the one or more real time flows, which in an aspect comprises the flow priority logic 208. The flow data acquisition logic 1200 also comprises a fourth module comprising means (1208) for acquiring flow data associated with the one or more real time flows based on the priority, which in an aspect comprises the acquisition processing logic 202.

The various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium is coupled to the processor, such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The description of the disclosed aspects is provided to enable any person skilled in the art to make or use the present invention. Various modifications to these aspects may be readily apparent to those skilled in the art, and the generic principles defined herein may be applied to other aspects, e.g., in an instant messaging service or any general wireless data communication applications, without departing from the spirit or scope of the invention. Thus, the present invention is not intended to be limited to the aspects shown herein but is to be accorded the widest scope consistent with the principles and novel features disclosed herein. The word "exemplary" is used exclusively herein to mean "serving as an example, instance, or illustration." Any aspect described herein as "exemplary" is not necessarily to be construed as preferred or advantageous over other aspects.

Accordingly, while aspects of a flow data acquisition system have been illustrated and described herein, it will be appreciated that various changes can be made to the aspects without departing from their spirit or essential characteristics. Therefore, the disclosures and descriptions herein are intended to be illustrative, but not limiting, of the scope of the invention, which is set forth in the following claims.

What is claimed is:

1. A method for flow data acquisition in a multi-frequency network, the method comprising:
   receiving one or more flow registrations associated with one or more flows, respectively;
   assigning a priority to each of the one or more flow registrations;
   grouping the one or more flows into flow groups based on the associated priority and RF channels carrying the one or more flows, wherein each flow group is assigned a ranking;
   selecting a selected flow group based on the ranking; and
   acquiring flow data for the flows associated with the selected flow group.

2. The method of claim 1, wherein said receiving comprises receiving the one or more flow registrations from at least one application.

3. The method of claim 1, wherein said receiving comprises:
   determining that the one or more flow registrations are associated with non real time flows; and
   determining that a maximum registration limit has not been reached.

4. The method of claim 1, wherein said receiving comprises:
   determining that the one or more flow registrations are associated with non real time flows;
   determining that a maximum registration limit has been reached;
   determining that a selected priority assigned to a selected flow registration is higher than each priority assigned to each previous registration;
   de-registering a lower priority previous registration; and
   registering the selected flow registration.

5. The method of claim 1, wherein said receiving comprises:
   determining that the one or more flow registrations are associated with non real time flows;
   determining that a maximum registration limit has been reached;
   determining that a selected priority assigned to a selected flow registration is lower than or equal to each priority assigned to each previous registration; and
   failing the selected flow registration.

6. The method of claim 1, wherein said assigning comprises assigning the priority based on pre-configured priority information.

7. The method of claim 1, wherein said assigning comprises assigning the priority based on dynamic priority information received from the network.

8. The method of claim 1, wherein said grouping comprises:
   determining an active flow set which identifies a set of registered flows which are present in a control channel and available in a current LOI, and
   combining flows from the active flow set to form one or more flow groups wherein each flow group includes selected flows which are carried on a selected RF channel and have identical flow priority.

9. The method of claim 8, wherein said grouping comprises:
   determining an updated active flow set whenever the set of registered flows present in the control channel changes; and
   combining flows from the updated active flow set into one or more flow groups.

10. The method of claim 1, wherein said grouping comprises assigning the ranking to each flow group based on one or more of:
    priority of flows in each flow group;
    total number of flows in each flow group; and
    RF channel identifier associated with each flow group.

11. The method of claim 1, wherein said selecting comprises:
    identifying a highest ranked flow group;
    switching to an RF channel carrying the identified flow group;
    determining an earliest flow start time for the identified flow group;
    determining that the earliest flow start time for the identified flow group minus a current time is less than a first time threshold; and
    selecting the identified flow group as the selected flow group.

12. The method of claim 1, wherein said selecting comprises:
    identifying a highest ranked flow group;
    setting the identified flow group to be the selected flow group;
    switching to an RF channel carrying the selected flow group;
    determining an earliest flow start time for the selected flow group;
    determining that the earliest flow start time for the selected flow group minus a current time is greater than or equal to a first time threshold; and
    repeating the following operations until a flow group is selected for which the earliest flow start time minus the current time is less than the first time threshold:
       identifying a next highest ranked flow group;
       determining an earliest flow start time for the next highest ranked flow group;
       determining that the difference between the earliest flow start time for the selected flow group and the next highest ranked flow group is greater than a second time threshold; and
       setting the next highest ranked flow group to be the selected flow group.

13. The method of claim 12, further comprises linking the selected flow group as a previous flow group for the next highest ranked flow group if it is determined that the difference between the earliest flow start time for the selected flow group and the next highest ranked flow group is greater than the second time threshold.

14. The method of claim 12, further comprises determining the earliest flow start time for a flow group based on distribution overhead received in a control channel.

15. The method of claim 1, wherein said acquiring comprises:
    determining that an earliest flow start time for a selected flow group is less than or equal to a current time;
    determining if the selected flow group is linked with a higher ranked previous flow group;
    setting a switch timer for a duration equal to the earliest flow start time for the previous flow group minus a current time if it is determined that the selected flow group is linked with the higher ranked previous flow group; and
    acquiring flow data associated with the selected flow group.

16. The method of claim 15, further comprising:
    determining that the switch timer has expired;
    preempting data acquisition associated with the current selected flow group;
    setting the previous flow group to be the selected flow group;
    switching to an RF channel carrying the selected flow group;
    acquiring flow data associated with the selected flow group.

17. The method of claim 1, further comprises:
    determining that said acquiring of the flow data for the flows associated with the selected flow group is completed; and
    acquiring flow data associated with a new flow group selected from a set of remaining flow groups.

18. The method of claim 1, wherein said acquiring comprises acquiring flow data for other flows groups carried on a current RF channel that is associated with the selected flow group.

19. The method of claim 1, wherein said acquiring further comprises:
receiving a real time flow activation associated with a real time flow; and
acquiring flow data associated with the selected flow group and the real time flow if the real time flow is available on an identical RF channel as the selected flow group.

20. The method of claim 1, wherein said acquiring further comprises:
receiving a real time flow activation associated with a real time flow;
preempting said acquiring if the real time flow is not available on an identical RF channel as the selected flow group;
switching to a selected RF channel associated with the real time flow; and
acquiring data associated with the real time flow on the selected RF channel.

21. An apparatus for flow data acquisition in a multi-frequency network, the apparatus comprising:
registration logic configured to receive one or more flow registrations associated with one or more flows, respectively;
priority logic configured to assign a priority to each of the one or more flow registrations; and
acquisition processing logic configured to group the one or more flows into flow groups based on the associated priority and RF channels carrying the one or more flows, wherein each flow group is assigned a ranking, select a selected flow group based on the ranking, and acquire flow data for the flows associated with the selected flow group.

22. The apparatus of claim 21, wherein said registration logic is configured to:
determine that the one or more flow registrations are associated with non real time flows; and
determine that a maximum registration limit has not been reached.

23. The apparatus of claim 21, wherein said acquisition processing logic is configured to:
determine an active flow set which identifies a set of registered flows which are present in a control channel and available in a current LOI, and
combine flows from the active flow set to form one or more flow groups wherein each flow group includes selected flows which are carried on a selected RF channel and have identical flow priority.

24. The apparatus of claim 21, wherein said acquisition processing logic is configured to assign the ranking to each flow group based on one or more of:
priority of flows in each flow group;
total number of flows in each flow group; and
RF channel identifier associated with each flow group.

25. The apparatus of claim 21, wherein said acquisition processing logic is configured to identify a highest ranked flow group, switch to an RF channel carrying the identified flow group, determine an earliest flow start time for the identified flow group, determine that the earliest flow start time for the identified flow group minus a current time is less than a first time threshold, and select the identified flow group as the selected flow group.

26. The apparatus of claim 21, wherein said acquisition processing logic is configured to:
identify a highest ranked flow group;
set the identified flow group to be the selected flow group;
switch to an RF channel carrying the selected flow group;
determine an earliest flow start time for the selected flow group;
determine that the earliest flow start time for the selected flow group minus a current time is greater than or equal to a first time threshold; and
repeat the following operations until a flow group is selected for which the earliest flow start time minus the current time is less than the first time threshold:
identify a next highest ranked flow group;
determine an earliest flow start time for the next highest ranked flow group;
determine that the difference between the earliest flow start time for the selected flow group and the next highest ranked flow group is greater than a second time threshold; and
set the next highest ranked flow group to be the selected flow group.

27. The apparatus of claim 26, wherein said acquisition processing logic is configured to link the selected flow group as a previous flow group for the next highest ranked flow group if it is determined that the difference between the earliest flow start time for the selected flow group and the next highest ranked flow group is greater than the second time threshold.

28. The apparatus of claim 21, wherein said acquisition processing logic is configured to:
determine that an earliest flow start time for a selected flow group is less than or equal to a current time;
determine if the selected flow group is linked with a higher ranked previous flow group;
set a switch timer for a duration equal to the earliest flow start time for the previous flow group minus a current time if it is determined that the selected flow group is linked with the higher ranked previous flow group; and
acquire flow data associated with the selected flow group.

29. The apparatus of claim 28, wherein said acquisition processing logic is configured to:
determine that the switch timer has expired;
preempt data acquisition associated with the current selected flow group;
set the previous flow group to be the selected flow group;
switch to an RF channel carrying the selected flow group;
acquire flow data associated with the selected flow group.

30. An apparatus for flow data acquisition in a multi-frequency network, the apparatus comprising:
means for receiving one or more flow registrations associated with one or more flows, respectively;
means for assigning a priority to each of the one or more flow registrations;
means for grouping the one or more flows into flow groups based on the associated priority and RF channels carrying the one or more flows, wherein each flow group is assigned a ranking;
means for selecting a selected flow group based on the ranking; and
means for acquiring flow data for the flows associated with the selected flow group.

31. The apparatus of claim 30, wherein said means for receiving comprises:
means for determining that the one or more flow registrations are associated with non real time flows; and
means for determining that a maximum registration limit has not been reached.

32. The apparatus of claim 30, wherein said means for grouping comprises:
   means for determining an active flow set which identifies a set of registered flows which are present in a control channel and available in a current LOI, and
   means for combining flows from the active flow set to form one or more flow groups wherein each flow group includes selected flows which are carried on a selected RF channel and have identical flow priority.

33. The apparatus of claim 30, wherein said means for grouping comprises means for assigning the ranking to each flow group based on one or more of:
   priority of flows in each flow group;
   total number of flows in each flow group; and
   RF channel identifier associated with each flow group.

34. The apparatus of claim 30, wherein said means for selecting comprises:
   means for identifying a highest ranked flow group;
   means for switching to an RF channel carrying the identified flow group;
   means for determining an earliest flow start time for the identified flow group;
   means for determining that the earliest flow start time for the identified flow group minus a current time is less than a first time threshold; and
   means for selecting the identified flow group as the selected flow group.

35. The apparatus of claim 30, wherein said means for selecting comprises:
   means for identifying a highest ranked flow group;
   means for setting the identified flow group to be the selected flow group;
   means for switching to an RF channel carrying the selected flow group;
   means for determining an earliest flow start time for the selected flow group;
   means for determining that the earliest flow start time for the selected flow group minus a current time is greater than or equal to a first time threshold; and
   means for repeating the following operations until a flow group is selected for which the earliest flow start time minus the current time is less than the first time threshold:
      identifying a next highest ranked flow group;
      determining an earliest flow start time for the next highest ranked flow group;
      determining that the difference between the earliest flow start time for the selected flow group and the next highest ranked flow group is greater than a second time threshold; and
      setting the next highest ranked flow group to be the selected flow group.

36. The apparatus of claim 35, further comprises means for linking the selected flow group as a previous flow group for the next highest ranked flow group if it is determined that the difference between the earliest flow start time for the selected flow group and the next highest ranked flow group is greater than the second time threshold.

37. The apparatus of claim 30, wherein said means for acquiring comprises:
   means for determining that an earliest flow start time for a selected flow group is less than or equal to a current time;
   means for determining if the selected flow group is linked with a higher ranked previous flow group;
   means for setting a switch timer for a duration equal to the earliest flow start time for the previous flow group minus a current time if it is determined that the selected flow group is linked with the higher ranked previous flow group; and
   means for acquiring flow data associated with the selected flow group.

38. The apparatus of claim 37, further comprising:
   means for determining that the switch timer has expired;
   means for preempting data acquisition associated with the current selected flow group;
   means for setting the previous flow group to be the selected flow group;
   means for switching to an RF channel carrying the selected flow group; and
   means for acquiring flow data associated with the selected flow group.

39. A computer program product for flow data acquisition in a multi-frequency network, the computer program product comprising:
   a machine-readable medium comprising:
   a first set of codes for causing a computer to receive one or more flow registrations associated with one or more flows, respectively;
   a second set of codes for causing the computer to assign a priority to each of the one or more flow registrations;
   a third set of codes for causing the computer to group the one or more flows into flow groups based on the associated priority and RF channels carrying the one or more flows, wherein each flow group is assigned a ranking;
   a fourth set of codes for causing the computer to select a selected flow group based on the ranking; and
   a fifth set of codes for causing the computer to acquire flow data for the flows associated with the selected flow group.

40. The computer program product of claim 39, wherein said first set of codes is configured to cause the computer to determine that the one or more flow registrations are associated with non real time flows, and determine that a maximum registration limit has not been reached.

41. The computer program product of claim 39, wherein said third set of codes is configured to cause the computer to determine an active flow set which identifies a set of registered flows which are present in a control channel and available in a current LOI, and combine flows from the active flow set to form one or more flow groups wherein each flow group includes selected flows which are carried on a selected RF channel and have identical flow priority.

42. The computer program product of claim 39, wherein said third set of codes is configured to cause the computer to assign the ranking to each flow group based on one or more of:
   priority of flows in each flow group;
   total number of flows in each flow group; and
   RF channel identifier associated with each flow group.

43. The computer program product of claim 39, wherein said fourth set of codes is configured to cause the computer to identify a highest ranked flow group, switch to an RF channel carrying the identified flow group, determine an earliest flow start time for the identified flow group, determine that the earliest flow start time for the identified flow group minus a current time is less than a first time threshold, and select the identified flow group as the selected flow group.

44. The computer program product of claim 39, wherein said fourth set of codes is configured to cause the computer to:
   identify a highest ranked flow group;
   set the identified flow group to be the selected flow group;
   switch to an RF channel carrying the selected flow group;
   determine an earliest flow start time for the selected flow group;

determine that the earliest flow start time for the selected flow group minus a current time is greater than or equal to a first time threshold; and repeat the following operations until a flow group is selected for which the earliest flow start time minus the current time is less than the first time threshold:
identify a next highest ranked flow group;
determine an earliest flow start time for the next highest ranked flow group;
determine that the difference between the earliest flow start time for the selected flow group and the next highest ranked flow group is greater than a second time threshold; and
set the next highest ranked flow group to be the selected flow group.

45. The computer program product of claim 44, further comprises a sixth set of codes for causing the computer to link the selected flow group as a previous flow group for the next highest ranked flow group if it is determined that the difference between the earliest flow start time for the selected flow group and the next highest ranked flow group is greater than the second time threshold.

46. The computer program product of claim 39, wherein said fifth set of codes is configured to cause the computer to determine that an earliest flow start time for a selected flow group is less than or equal to a current time, determine if the selected flow group is linked with a higher ranked previous flow group, set a switch timer for a duration equal to the earliest flow start time for the previous flow group minus a current time if it is determined that the selected flow group is linked with the higher ranked previous flow group, and acquire flow data associated with the selected flow group.

47. The computer program product of claim 46, further comprises a sixth set of codes for causing the computer to determine that the switch timer has expired, preempt data acquisition associated with the current selected flow group, set the previous flow group to be the selected flow group, switch to an RF channel carrying the selected flow group, acquire flow data associated with the selected flow group.

48. At least one integrated circuit configured to perform flow data acquisition in a multi-frequency network, the at least one integrated circuit comprising:
a first module configured to receive one or more flow registrations associated with one or more flows, respectively;
a second module configured to assign a priority to each of the one or more flow registrations;
a third module configured to group the one or more flows into flow groups based on the associated priority and RF channels carrying the one or more flows, wherein each flow group is assigned a ranking;
a fourth module configured to select a selected flow group based on the ranking; and
a fifth module configured to acquire flow data for the flows associated with the selected flow group.

49. The at least one integrated circuit of claim 48, wherein said first module is configured to determine that the one or more flow registrations are associated with non real time flows, and determine that a maximum registration limit has not been reached.

50. The at least one integrated circuit of claim 48, wherein said third module is configured to determine an active flow set which identifies a set of registered flows which are present in a control channel and available in a current LOI, and combine flows from the active flow set to form one or more flow groups wherein each flow group includes selected flows which are carried on a selected RF channel and have identical flow priority.

51. The at least one integrated circuit of claim 48, wherein said third module is configured to assign the ranking to each flow group based on one or more of:
priority of flows in each flow group;
total number of flows in each flow group; and
RF channel identifier associated with each flow group.

52. The at least one integrated circuit of claim 48, wherein said fourth module is configured to identify a highest ranked flow group, switch to an RF channel carrying the identified flow group, determine an earliest flow start time for the identified flow group, determine that the earliest flow start time for the identified flow group minus a current time is less than a first time threshold, and select the identified flow group as the selected flow group.

53. The at least one integrated circuit of claim 48, wherein said fourth module is configured to:
identify a highest ranked flow group;
set the identified flow group to be the selected flow group;
switch to an RF channel carrying the selected flow group;
determine an earliest flow start time for the selected flow group;
determine that the earliest flow start time for the selected flow group minus a current time is greater than or equal to a first time threshold; and
repeat the following operations until a flow group is selected for which the earliest flow start time minus the current time is less than the first time threshold:
identify a next highest ranked flow group;
determine an earliest flow start time for the next highest ranked flow group;
determine that the difference between the earliest flow start time for the selected flow group and the next highest ranked flow group is greater than a second time threshold; and
set the next highest ranked flow group to be the selected flow group.

54. The at least one integrated circuit of claim 53, further comprises a sixth module configured to link the selected flow group as a previous flow group for the next highest ranked flow group if it is determined that the difference between the earliest flow start time for the selected flow group and the next highest ranked flow group is greater than the second time threshold.

55. The at least one integrated circuit of claim 48, wherein said fifth module is configured to determine that an earliest flow start time for a selected flow group is less than or equal to a current time, determine if the selected flow group is linked with a higher ranked previous flow group, set a switch timer for a duration equal to the earliest flow start time for the previous flow group minus a current time if it is determined that the selected flow group is linked with the higher ranked previous flow group, and acquire flow data associated with the selected flow group.

56. The at least one integrated circuit of claim 55, further comprises a sixth module configured to determine that the switch timer has expired, preempt data acquisition associated with the current selected flow group, set the previous flow group to be the selected flow group, switch to an RF channel carrying the selected flow group, acquire flow data associated with the selected flow group.

57. A processor configured to perform a method for flow data acquisition in a multi-frequency network, the method comprising:

receiving one or more flow registrations associated with one or more flows, respectively;

assigning a priority to each of the one or more flow registrations;

grouping the one or more flows into flow groups based on the associated priority and RF channels carrying the one or more flows, wherein each flow group is assigned a ranking;

selecting a selected flow group based on the ranking; and acquiring flow data for the flows associated with the selected flow group.

58. The processor of claim 57, wherein receiving one or more flow registrations comprises:

determining that the one or more flow registrations are associated with non real time flows; and determining that a maximum registration limit has not been reached.

59. The processor of claim 57, wherein grouping the one or more flows comprises:

determining an active flow set which identifies a set of registered flows which are present in a control channel and available in a current LOI, and combining flows from the active flow set to form one or more flow groups wherein each flow group includes selected flows which are carried on a selected RF channel and have identical flow priority.

60. The processor of claim 57, wherein grouping the one or more flows comprises assigning the ranking to each flow group based on one or more of:

priority of flows in each flow group;

total number of flows in each flow group; and

RF channel identifier associated with each flow group.

61. The processor of claim 57, wherein selecting the selected flow group comprises:

identifying a highest ranked flow group;

switching to an RF channel carrying the identified flow group;

determining an earliest flow start time for the identified flow group;

determining that the earliest flow start time for the identified flow group minus a current time is less than a first time threshold; and selecting the identified flow group as the selected flow group.

62. The processor of claim 57, wherein selecting the selected flow group comprises:

identifying a highest ranked flow group;

setting the identified flow group to be the selected flow group;

switching to an RF channel carrying the selected flow group;

determining an earliest flow start time for the selected flow group;

determining that the earliest flow start time for the selected flow group minus a current time is greater than or equal to a first time threshold; and repeating the following operations until a flow group is selected for which the earliest flow start time minus the current time is less than the first time threshold:

identifying a next highest ranked flow group;

determining an earliest flow start time for the next highest ranked flow group;

determining that the difference between the earliest flow start time for the selected flow group and the next highest ranked flow group is greater than a second time threshold; and setting the next highest ranked flow group to be the selected flow group.

63. The processor of claim 62, further comprising:

linking the selected flow group as a previous flow group for the next highest ranked flow group if it is determined that the difference between the earliest flow start time for the selected flow group and the next highest ranked flow group is greater than the second time threshold.

64. The processor of claim 57, wherein acquiring the flow data comprises:

determining that an earliest flow start time for a selected flow group is less than or equal to a current time;

determining if the selected flow group is linked with a higher ranked previous flow group;

setting a switch timer for a duration equal to the earliest flow start time for the previous flow group minus a current time if it is determined that the selected flow group is linked with the higher ranked previous flow group; and acquiring flow data associated with the selected flow group.

65. The processor of claim 64, further comprising:

determining that the switch timer has expired;

preempting data acquisition associated with the current selected flow group;

setting the previous flow group to be the selected flow group;

switching to an RF channel carrying the selected flow group; and acquiring flow data associated with the selected flow group.

* * * * *